US011960973B2

(12) United States Patent
Chen et al.

(10) Patent No.: US 11,960,973 B2
(45) Date of Patent: Apr. 16, 2024

(54) METHOD AND APPARATUS FOR CROSSTALK ANALYSIS OF QUBITS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yuqin Chen, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 241 days.

(21) Appl. No.: 17/674,793

(22) Filed: Feb. 17, 2022

(65) Prior Publication Data
US 2022/0230088 A1 Jul. 21, 2022

Related U.S. Application Data

(63) Continuation of application No. PCT/CN2021/114409, filed on Aug. 25, 2021.

(30) Foreign Application Priority Data

Jan. 18, 2021 (CN) .......................... 202110061593.2

(51) Int. Cl.
*G06N 10/70* (2022.01)
(52) U.S. Cl.
CPC .................................. *G06N 10/70* (2022.01)
(58) Field of Classification Search
CPC ........ G06N 10/70; G06N 10/40; G06N 10/00; G06N 10/20
See application file for complete search history.

(56) References Cited

U.S. PATENT DOCUMENTS 10,223,643 B1 * 3/2019 Bishop .................. G06N 10/00
2009/0259905 A1 10/2009 Silva et al.
(Continued)

FOREIGN PATENT DOCUMENTS

CN 110488091 A 11/2019
CN 110738321 A 1/2020
(Continued)

OTHER PUBLICATIONS

Rudinger et al. "Experimental Characterization of Crosstalk Errors with Simultaneous Gate Set Tomography" PRX Quantum, vol. 2, issue 4, p. 040338, Nov. 2021, American Physical Society, doi 10.1103/PRXQuantum.2.040338 (Year: 2021).*
(Continued)

*Primary Examiner* — Cynthia Britt
(74) *Attorney, Agent, or Firm* — ANOVA LAW GROUP PLLC

(57) ABSTRACT

This application relates to a method for analyzing crosstalk between qubits, performed by a terminal. The method includes identifying a first qubit and a second qubit; performing spectral quantum process tomography on quantum states corresponding to the first qubit and the second qubit, to obtain a first eigenspectrum of a signal function corresponding to the first qubit and a second eigenspectrum of a signal function corresponding to the second qubit; performing spectral quantum process tomography on the quantum states corresponding to the first qubit and the second qubit, to obtain a third eigenspectrum of a common signal function of the first qubit and the second qubit; and determining a crosstalk intensity between the first qubit and the second qubit based on the first eigenspectrum, the second eigenspectrum, and the third eigenspectrum.

20 Claims, 11 Drawing Sheets

(56) References Cited

U.S. PATENT DOCUMENTS

| | | | |
|---|---|---|---|
| 2019/0156239 A1* | 5/2019 | Martinis | G06N 10/20 |
| 2021/0099201 A1* | 4/2021 | Winick | H04B 3/32 |
| 2021/0166149 A1 | 6/2021 | Hsieh et al. | |
| 2022/0067253 A1 | 3/2022 | Chen et al. | |

FOREIGN PATENT DOCUMENTS

| | | |
|---|---|---|
| CN | 111814362 A | 10/2020 |
| CN | 113011592 A | 6/2021 |
| EP | 3989098 A1 | 4/2022 |
| KR | 20150089382 A | 8/2015 |
| WO | 2020228470 A1 | 11/2020 |

OTHER PUBLICATIONS

Ding et al. "Systematic Crosstalk Mitigation for Superconducting Qubits via Frequency-Aware Compilation," 2020 53rd Annual IEEE/ACM International Symposium on Microarchitecture (MICRO), Athens, Greece, 2020, pp. 201-214, doi: 10.1109/MICRO50266.2020.00028. (Year: 2020).*

The Japan Patent Office (JPO) Decision to Grant a Patent for Application No. 2022-513589 and Translation dated Apr. 24, 2023 5 Pages.

Ash-Saki Aboullah et al: "Experimental Characterization, Modeling, and Analysis of Crosstalk in a Ouantum Computer",IEEE Transactions on Ouantum Engineering, IEEE, vol. 1, Oct. 6, 2020, pp. 1-6.

Yasuhiro Ohkura, et al., "Crosstalk-aware NISQ Multi-programming", IPSJ SIG Technical Report, vol. 2020-QS-1 No. 2 Oct. 16, 2020.

The State Intellectual Property Office of the People's Republic of China (SIPO) Office Action 1 for for 202110061593.2 dated Dec. 14, 2021 6 Pages (including translation).

The World Intellectual Property Organization (WIPO) International Search Report for PCT/CN2021/114409 dated Nov. 25, 2021 7 Pages (including translation).

K. Khodjasteh et al., "Fault-Tolerant Quantum Dynamical Decoupling," Phys. Rev. Lett. 95, 180501, Oct. 2005. 4 pages.

J. Helsen et al., "Spectral quantum tomography," npj Quantum Information, 2019, 5(1): 1-11. 11 pages.

J. M. Gambetta et al., "Characterization of addressability by simultaneous randomized benchmarking," Physical review letters, 109, 240504, Dec. 2012. 5 pages.

David C. McKay et al. "Correlated randomized benchmarking," arXiv preprint arXiv:2003.02354, Mar. 4, 2020. 10 pages.

S. Krastanov et al., "Unboxing Quantum Black Box Models: Learning Non-Markovian Dynamics," arXiv preprint arXiv:2009.03902, Sep. 8, 2020. 9 pages.

The European Patent Office (EPO) The Extended European Search Report for 21839812.1 dated Oct. 24, 2022 11 Pages (including translation).

Ash-Saki Aboullah et al: "Experimental Characterization, Modeling, and Analysis of Crosstalk in a Ouantum Computer",IEEE Transactions on Ouantum Engineering, IEEE, vol. 1, Sep. 9, 2020 (Sep. 9, 2020), pp. 1-6, XP011813436,001: 10.11 09/TOE.2020.3023338.

Blume-Kohout Robin: "Idle Tomography",, Dec. 1, 2018 (Dec. 1, 2018), XP055970962,Retrieved from the Internet: URL:https://www.osti.gov/servlets/purl/1581878.

Yu-Qin Chen et al: "Spectral Transfer Tensor Method for NonMarkovian Noise Characterization",arxiv.org, Cornell University Library,201 Olin Library Cornell University Ithaca. NY 14853. Dec. 18, 2020(Dec. 18, 2020), XP081841107.

* cited by examiner

METHOD AND APPARATUS FOR CROSSTALK ANALYSIS OF QUBITS, COMPUTER DEVICE, AND STORAGE MEDIUM

RELATED APPLICATIONS

This application is a continuation application of PCT Application No. PCT/CN2021/114409, filed on Aug. 25, 2021, which in turn claims priority to Chinese Patent Application No. 2021100615932, filed with the China National Intellectual Property Administration on Jan. 18, 2021, and entitled "CROSSTALK ANALYSIS METHOD AND APPARATUS FOR QUBITS, COMPUTER DEVICE, AND STORAGE MEDIUM". The two applications are incorporated herein by reference in their entirety.

FIELD OF THE TECHNOLOGY

This application relates to the field of quantum computation technologies, and in particular, to a method and apparatus for analyzing crosstalk of qubits, a computer device, and a storage medium.

BACKGROUND OF THE DISCLOSURE

Quantum computation is becoming increasingly popular because of its advantage of processing massive data quickly and efficiently. A quantum state corresponding to a qubit is a linear superposition state of 0 and 1. After the qubit is operated, the quantum state corresponding to the qubit is changed. On a quantum product (such as a quantum chip), the change is reflected as that after the quantum product is executed, the quantum state of the qubit is an execution result of the quantum product.

However, quantum products are susceptible to interference from quantum noise, which affects the performance of the quantum products. Therefore, it is very important to analyze noise crosstalk between qubits. In a conventional qubit crosstalk analysis solution, various Clifford gates with noise processes are applied to qubits to analyze an error rate between two subsystems. The error rate describes crosstalk between the qubits. Because a randomized benchmark test reflects an average result of all types of gate noise and various bath noises, the analyzed crosstalk cannot be applied to improve manufacturing and optimization of quantum products.

SUMMARY

According to various embodiments of this application, a method and apparatus for analyzing crosstalk of qubits, a computer device, and a storage medium are provided.

One aspect of the present disclosure provides a method for analyzing crosstalk between qubits, performed by a terminal. The method includes identifying a first qubit and a second qubit; performing spectral quantum process tomography on quantum states corresponding to the first qubit and the second qubit, to obtain a first eigenspectrum of a signal function corresponding to the first qubit and a second eigenspectrum of a signal function corresponding to the second qubit; performing spectral quantum process tomography on the quantum states corresponding to the first qubit and the second qubit, to obtain a third eigenspectrum of a common signal function of the first qubit and the second qubit; and determining a crosstalk intensity between the first qubit and the second qubit based on the first eigenspectrum, the second eigenspectrum, and the third eigenspectrum.

Another aspect of the present disclosure provides a crosstalk analysis apparatus for qubits. The apparatus includes a determining module, configured to identify a first qubit and a second qubit; a first tomography module, configured to perform spectral quantum process tomography on quantum states respectively corresponding to the first qubit and the second qubit, to obtain a first eigenspectrum of a signal function corresponding to the first qubit and a second eigenspectrum of a signal function corresponding to the second qubit; a second tomography module, configured to perform spectral quantum process tomography on the quantum states respectively corresponding to the first qubit and the second qubit, to obtain a third eigenspectrum of a common signal function of the first qubit and the second qubit; and a calculation module, configured to determine a crosstalk intensity between the first qubit and the second qubit based on the first eigenspectrum, the second eigenspectrum, and the third eigenspectrum.

Another aspect of the present disclosure provides a non-transitory computer-readable storage medium, storing a computer program, the computer program, when executed by a processor, implementing the following operations: identifying a first qubit and a second qubit; performing spectral quantum process tomography on quantum states corresponding to the first qubit and the second qubit, to obtain a first eigenspectrum of a signal function corresponding to the first qubit and a second eigenspectrum of a signal function corresponding to the second qubit; performing spectral quantum process tomography on the quantum states corresponding to the first qubit and the second qubit, to obtain a third eigenspectrum of a common signal function of the first qubit and the second qubit; and determining a crosstalk intensity between the first qubit and the second qubit based on the first eigenspectrum, the second eigenspectrum, and the third eigenspectrum.

Details of one or more embodiments of this application are provided in the accompanying drawings and descriptions below. Other features and advantages of this application become clearer from the specification, the accompanying drawings, and the claims.

BRIEF DESCRIPTION OF THE DRAWINGS

The accompanying drawings described herein are used for providing further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

The terms such as "first" and "second" in this specification, the claims, and the foregoing accompanying drawings of the present disclosure are intended to distinguish between similar objects rather than describe a particular sequence or a chronological order. It is understood that the data termed in such a way is interchangeable in proper circumstances, so that the embodiments of the present disclosure described herein can be implemented in orders except the order illustrated or described herein.

Before this application is described in detail, abbreviations and key terms are first described:

Quantum computation is a computation method in which computation is performed based on quantum logic.

A qubit is a unit used for recording quantum information, and is a basic unit for quantum computation. During quantum computation, 0 and 1 may be simultaneously computed, and a system may be in a linear superposition state of 0 and 1: $|\psi\rangle = \alpha|0\rangle + \beta|1\rangle$, where $\alpha$ and $\beta$ herein represent probability amplitudes of the system on 0 and 1, which are complex numbers, and squares of moduli of the complex numbers represent probabilities of being 0 and 1.

A quantum noise process is a quantum information pollution process caused by the interaction between a quantum product and the bath or by the imperfect control.

Crosstalk noise of qubits is interference noise caused by mutual interference and incomplete independence of bit information on a quantum product, for example, crosstalk between microwave control lines, correlated noise generated by qubits due to being in the same bath, and direct coupling between qubits. The crosstalk noise of qubits restricts a scale of the quantum product (for example, a quantum chip) to a great degree.

TPCP dynamic mapping is a trace-preserving and all-positive dynamic mapping. Specifically, trace-preserving means that a trace of a quantum state density operator during the dynamic evolution is unchanged. All-positive means that if the density operator is nonnegative, any part of the dynamic mapping acting on the density operator is kept nonnegative.

Dynamic decoupling is an effective means for suppressing decoherence, which is mainly to effectively suppress mutual coupling between a qubit and the bath by applying constantly flipping pulses at particular time points (for example, at a specific frequency), thereby suppressing decoherence.

Figure 1A:
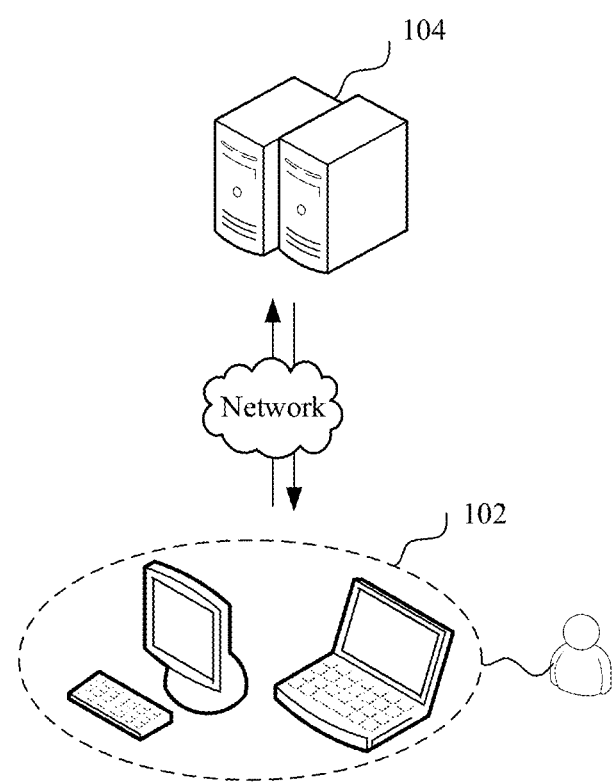
FIG. 1a is a diagram of an application environment of a method for analyzing crosstalk between qubits according to one embodiment.

The method for analyzing crosstalk between qubits provided in this application may be applied to an application environment shown in FIG. 1*a*. A terminal 102 communicates with a server 104 through a network. The method for analyzing crosstalk between qubits is applicable to the terminal 102, which is specifically as follows: The terminal 102 determines a first qubit and a second qubit that are to be analyzed; performs spectral quantum process tomography on quantum states respectively corresponding to the first qubit and the second qubit, to obtain a first eigenspectrum of a signal function corresponding to the first qubit and a second eigenspectrum of a signal function corresponding to the second qubit; performs spectral quantum process tomography on the quantum states respectively corresponding to the first qubit and the second qubit, to obtain a third eigenspectrum of a common signal function of the first qubit and the second qubit; and determines a crosstalk intensity between the first qubit and the second qubit based on the first eigenspectrum, the second eigenspectrum, and the third eigenspectrum, and then displays the crosstalk intensity. In some embodiments, the spectral quantum process tomography on quantum states respectively corresponding to the first qubit and the second qubit may be sequentially performed, to obtain the first eigenspectrum of the signal function corresponding to the first qubit and the second eigenspectrum of the signal function corresponding to the second qubit. In some embodiments, the spectral quantum process tomography on the quantum states respectively corresponding to the first qubit and the second qubit may be synchronously performed, to obtain the third eigenspectrum of the common signal function of the first qubit and the second qubit.

The method for analyzing crosstalk between qubits is applicable to the server 104, which is specifically as follows: The server 104 determines a first qubit and a second qubit that are to be analyzed; sequentially performs spectral quantum process tomography on quantum states respectively corresponding to the first qubit and the second qubit, to obtain a first eigenspectrum of a signal function corresponding to the first qubit and a second eigenspectrum of a signal function corresponding to the second qubit; synchronously performs spectral quantum process tomography on the quantum states respectively corresponding to the first qubit and the second qubit, to obtain a third eigenspectrum of a common signal function of the first qubit and the second qubit; and determines a crosstalk intensity between the first qubit and the second qubit based on the first eigenspectrum, the second eigenspectrum, and the third eigenspectrum, and then displays the crosstalk intensity on the terminal 102.

The terminal 102 may be various computers, notebook computers, or the like installed with a qiskit simulator. The server 104 may be implemented by using an independent server or a server cluster that includes a plurality of servers. A giskit simulator may also be installed on the server 104.

One embodiment, as shown in FIG. Tb, provides a method for analyzing crosstalk between qubits. The method is applicable to the terminal or server in FIG. Ta. A description is provided by using an example in which the method is applied to the terminal. The method includes the following steps:

S102: Determine a first qubit and a second qubit that are to be analyzed.

The terminal may be an electronic device integrated with a quantum circuit or quantum chip, for example, a quantum computer; or the terminal may be an independent quantum chip, for example, a superconducting quantum chip. The first qubit and the second qubit may be two qubits to be analyzed and including different quantum information.

For a quantum chip, a quantity of qubits may be n, where n is greater than 2. For example, there are 72 qubits. A larger quantity of qubits indicates a stronger computation capability of the quantum chip. In one embodiment, the terminal may determine a first qubit and a second qubit that are to be analyzed from a plurality of qubits.

S104: perform spectral quantum process tomography on quantum states respectively corresponding to the first qubit and the second qubit, to obtain a first eigenspectrum of a signal function corresponding to the first qubit and a second eigenspectrum of a signal function corresponding to the second qubit. In some embodiments, the spectral quantum process tomography may be sequentially performed.

The eigenspectrum may be a dynamic mapping eigenspectrum formed by a quantum during evolution. Spectral quantum process tomography may be that a plurality of types of quantum states of different qubits are inputted into an unknown quantum process, for example, a quantum channel or quantum gate, after the quantum states interact with the unknown quantum process, outputted quantum states are measured, and then the quantum process is estimated based on a relationship between the input and the output.

The quantum state may be a state of a quantum, for example, 0, 1, or a linear superposition state of 0 and 1, $|\psi\rangle = \alpha|0\rangle + \beta|1\rangle$, where $\alpha$ and $\beta$ respectively represent probability amplitudes when the qubit is 0 and 1, $\alpha$ and $\beta$ are complex numbers, and squares $|\alpha|^2$ and $|\beta|^2$ of moduli of the complex numbers represent probabilities of being 0 and 1.

In one embodiment, spectral quantum process tomography is performed on the quantum states respectively corresponding to the first qubit and the second qubit both based on an identity gate, the identity gate being a free evolution gate that does not perform a real operation on a quantum circuit in which the first qubit and the second qubit are located.

For step S104, specifically, the terminal may perform spectral quantum process tomography on the quantum states respectively corresponding to the first qubit and the second qubit both based on an identity gate at the same time point, or may sequentially perform spectral quantum process tomography on the quantum states respectively corresponding to the first qubit and the second qubit at different time points. During spectral quantum process tomography performed at different time points, when spectral quantum process tomography is performed on the quantum state corresponding to the first qubit, the second qubit keeps waiting; and when spectral quantum process tomography is performed on the quantum state corresponding to the second qubit, the first qubit keeps waiting.

In one embodiment, the step of spectral quantum process tomography on the first qubit may specifically include: performing, by the terminal, spectral quantum process tomography on the quantum state of the first qubit based on an identity gate, and parsing the signal function that corresponds to the first qubit and is obtained through tomography, to obtain the first eigenspectrum, the second qubit being in a waiting state in a case that spectral quantum process tomography is performed on the quantum state of the first qubit.

For example, during spectral quantum process tomography performed on a first qubit q0 based on an identity gate, during preparation of a quantum state, the first qubit undergoes a TPCP dynamic mapping of a preparation error $N_{prep}$, the identity gate acts on the first qubit k times. During measurement of the quantum state, the first qubit undergoes a TPCP dynamic mapping of a measurement error $N_{meas}$. A series of signal functions $\{g_0(0), \ldots g_0(k)\}$ are first constructed:

$$g_0(k) = \Sigma_{\mu=1}^{N} Tr[P_\mu N_{meas} \diamond \Lambda \diamond N_{prep}(P_\mu)],$$

where $P_\mu$ represents a Pauli matrix, $N_{meas}$ represents the measurement error, $N_{prep}$ represents the preparation error, $\Lambda$ represents a dynamic mapping eigenspectrum, which is formed after the identity gate acts k times; and $\diamond$ represents the operation of a superoperator.

First, an initial state of the qubit is prepared by using an eigenbasis of the Pauli matrix; then the quibit undergoes k times of quantum gate evolution, that is, free evolution of the identity gate; subsequently measurement is performed under a selected Pauli operator, and the foregoing steps are repeated for Pauli matrices and eigenbases that are unused; and finally a matrix pencil method may be introduced to parse the group of signal functions for a special form of the foregoing signal functions, to obtain a dynamic mapping eigenspectrum $\Lambda = \{1, \lambda_{0,x}, \lambda_{0,y}, \lambda_{0,z}\}$ with no preparation error and no measurement error.

In one embodiment, the step of spectral quantum process tomography on the second qubit may specifically include: performing, by the terminal, spectral quantum process tomography on the quantum state of the second qubit, and parsing the signal function that corresponds to the second qubit and is obtained through tomography, to obtain the second eigenspectrum, the first qubit being in a waiting state when spectral quantum process tomography is performed on the quantum state of the second qubit. For specific steps of spectral quantum process tomography corresponding to the second qubit, reference may be made to the foregoing spectral quantum process tomography corresponding to the first qubit.

Figure 2:
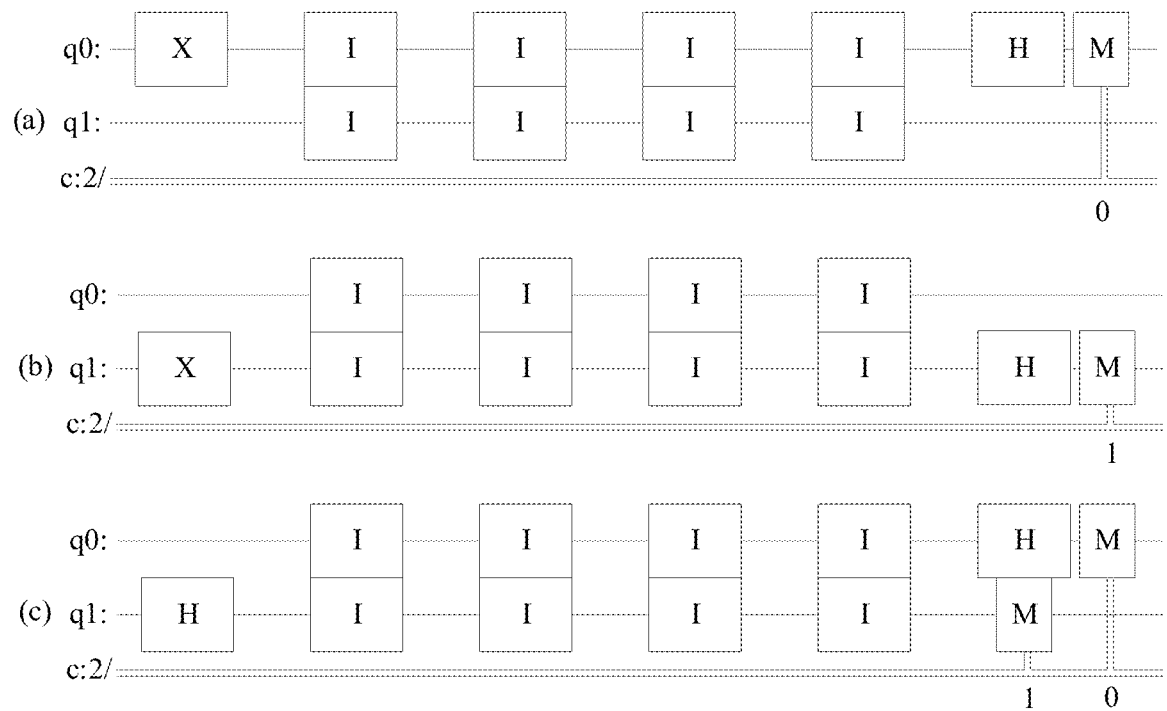
FIG. 2 is a schematic diagram of spectral quantum process tomography based on an identity gate according to one embodiment.

For example, as shown in FIG. 2, the diagram (a) in FIG. 2 illustrates that spectral quantum process tomography is performed on a quantum state of the first qubit q0 based on an an identity gate, and during spectral quantum process tomography performed on the quantum state of the first qubit q0, a second qubit q1 keeps waiting. The diagram (b) in FIG. 2 illustrates that spectral quantum process tomography is performed on a quantum state of the second qubit q1 based on the identity gate, and during spectral quantum process tomography performed on the quantum state of the second qubit q1, the first qubit q0 keeps waiting. X represents a preparation process; I represents a free evolution process, that is, performing a free evolution process by using the identity gate; and H and M represent measurement in different directions, and c represents a measurement line.

S106: perform spectral quantum process tomography on the quantum states respectively corresponding to the first qubit and the second qubit, to obtain a third eigenspectrum of a common signal function of the first qubit and the second qubit. In some embodiments, the spectral quantum process tomography may be synchronously performed.

In one embodiment, spectral quantum process tomography is performed on the quantum states respectively corresponding to the first qubit and the second qubit both based on an identity gate, the identity gate being a free evolution gate that does not perform a real operation on a quantum circuit in which the first qubit and the second qubit are located.

Specifically, the terminal performs spectral quantum process tomography on the quantum states respectively corresponding to the first qubit and the second qubit, to obtain the common signal function of the first qubit and the second qubit, the common signal function including parameters representing a quantum preparation error and a quantum measurement error; and parses the common signal function to obtain the third eigenspectrum. In some embodiments, the spectral quantum process tomography is synchronously performed.

In a process of synchronously performing spectral quantum process tomography on the quantum states respectively corresponding to the first qubit and the second qubit, respective preparation errors and respective measurement errors of the first qubit and the second qubit are obtained, the common signal function of the first qubit and the second qubit is constructed based on the obtained preparation errors and measurement errors, the quantum gate evolution, and the Pauli matrix, and then the common signal function is parsed to obtain the third eigenspectrum.

For example, as shown in the diagram (c) in FIG. 2, the diagram (c) in FIG. 2 illustrates that spectral quantum process tomography is performed on the quantum states of the first qubit q0 and the second qubit q1 based on the identity gate. The terminal synchronously performs spectral quantum process tomography on the quantum states respectively corresponding to the first qubit q0 and the second qubit q1 based on the identity gate, so as to obtain a common signal function $g_{01}(0), \ldots, g_{01}(K)$ of the first qubit q0 and the second qubit q1, where $$g_{01}(k) = \Sigma_{\mu=1}^{N} Tr[P_\mu N'_{meas} \Diamond \Lambda' \Diamond N'_{prep}(P_\mu)].$$

$N'_{meas}$ and $N'_{prep}$ respectively represent the measurement error and the preparation error, and $\Lambda'$ represents an eigenspectrum formed when the identity gate is applied to the first qubit q0 and the second qubit q1.

First, an initial state of the qubit is prepared by using an eigenbasis of the Pauli matrix; then the qubit undergoes k times of quantum gate evolution, that is, free evolution of the identity gate; subsequently measurement is performed under a selected Pauli operator, and the foregoing steps are repeated for Pauli matrices and eigenbases that are unused; and finally a matrix pencil method may be introduced to parse the group of signal functions for a special form of the foregoing signal functions, to obtain a dynamic mapping eigenspectrum $\Lambda = \{1, \lambda_{ix}, \lambda_{iy}, \lambda_{iz}, \ldots, \lambda_{zx}, \lambda_{zy}, \lambda_{zz}\}$ with no preparation error and no measurement error.

S108: Determine a crosstalk intensity between the first qubit and the second qubit based on the first eigenspectrum, the second eigenspectrum, and the third eigenspectrum.

The crosstalk may be coupling crosstalk, correlation crosstalk, or the like, and corresponding crosstalk intensity may be a coupling crosstalk intensity and/or correlation crosstalk intensity.

Assuming that there is no crosstalk of a direct coupling or correlated noise type between the first qubit q0 and the second qubit q1, then a dynamic mapping $\varepsilon_{AB}$ of the first qubit q0 and the second qubit q1 and respective single-bit dynamic mappings $\varepsilon_A$, $\varepsilon_B$ meet $\varepsilon_{AB} = \varepsilon_A \otimes \varepsilon_B$, where $\otimes$ represents a tensor product operation. Therefore, the eigenspectrum $\Lambda_{AB}$ of the first qubit q0 and the second qubit q1 and respective eigenspectra $\Lambda_A$ and $\Lambda_B$ meet the following relationship: $\Lambda_{AB} = \Lambda_A \otimes \Lambda_B$.

Because there is crosstalk of a direct coupling or correlated noise type between the first qubit q0 and the second qubit q1, a degree of indivisibility $\Delta\Lambda = |\Lambda_{AB} - \Lambda_A \otimes \Lambda_B|$ of eigenspectra between the first qubit q0 and the second qubit q1 can be calculated. The degree of indivisibility $\Delta\Lambda$ is closely related to a crosstalk intensity between the first qubit q0 and the second qubit q1.

Therefore, the terminal may calculate a tensor product between the first eigenspectrum and the second eigenspectrum; determine a degree of indivisibility of eigenspectra based on a difference between the third eigenspectrum and the tensor product; and determine the degree of indivisibility as the crosstalk intensity between the first qubit and the second qubit, so that the crosstalk intensity is $\Delta\Lambda = |\Lambda_{AB} - \Lambda_A \otimes \Lambda_B|$.

For example, if the first eigenspectrum, the second eigenspectrum, and the third eigenspectrum are n×n matrices, the crosstalk intensity $\Delta\Lambda = |\Lambda_{AB} - \Lambda_A \otimes \Lambda_B| = \Sigma_{i=0}^{n} |(\Lambda_{AB} - \Lambda_A \otimes \Lambda_B)_{ii}|$, where n is a positive integer greater than 2, and ii is used for representing a diagonal element of a matrix.

In the foregoing embodiment, spectral quantum process tomography is first sequentially performed on the quantum states respectively corresponding to the first qubit and the second qubit, to obtain the first eigenspectrum of the signal function corresponding to the first qubit and the second eigenspectrum of the signal function corresponding to the second qubit. Then spectral quantum process tomography is synchronously performed on the quantum states respectively corresponding to the first qubit and the second qubit, to obtain the third eigenspectrum of the signal function corresponding to the combination. Because the degrees of indivisibility among the first eigenspectrum, the second eigenspectrum, and the third eigenspectrum are closely related to a crosstalk intensity between the qubits, the crosstalk intensity between the qubits can be obtained according to the first eigenspectrum, the second eigenspectrum, and the third eigenspectrum. The crosstalk intensity is not an average result of all types of gate noise and various bath noise. This method may be applied to manufacturing and optimization processes of quantum products, and can provide detailed guidance for the manufacturing and optimization of the quantum products. In addition, there are information losses of the eigenspectrum for common quantum noise channels, and compared with a random benchmark test with an information loss only for a depolarization channel, the crosstalk intensity obtained according to the first eigenspectrum, the second eigenspectrum, and the third eigenspectrum is more universal, thereby better facilitating detailed guidance in the manufacturing and optimization of the quantum products based on the crosstalk intensity.

In one embodiment, for direct coupling crosstalk analysis between the qubits, steps of the analysis may specifically include: determining, by the terminal, a first bath noise model of the first qubit and the second qubit when both the first qubit and the second qubit are in a pure dephasing noise bath; and obtaining a qubit coupling method, and determining a coupling crosstalk intensity between the first qubit and the second qubit according to the qubit coupling method, the first bath noise model, and the crosstalk intensity, the coupling crosstalk intensity oscillating and attenuating with time and containing no preparation error and no measurement error.

For a first qubit and a second qubit independent of each other, $H_S=\omega_1\sigma_1^z+\omega_2\sigma_2^z$. Assuming that both the first qubit and the second qubit are in independent pure dephasing noise baths, a first bath noise model $H_{SB}=f_1(t)\sigma_1^z+f_2(t)\sigma_2^z$ of the first qubit and the second qubit can be obtained, where $f_1(t)$ and $f_2(t)$ respectively represent noise functions corresponding to noise baths in which the first qubit and the second qubit are respectively located, and $\sigma_1^Z$ and $\sigma_2^Z$ respectively represent Pauli matrices corresponding to the first qubit and the second qubit. Considering that coupling of qubits on a superconducting quantum chip has a specific form, a qubit coupling method $H_{ZZ}=\omega_{ZZ}\sigma_1^z\sigma_2^z$ between the first qubit and the second qubit can be determined, where $\omega_{ZZ}$ is coupling strength.

Figure 3:
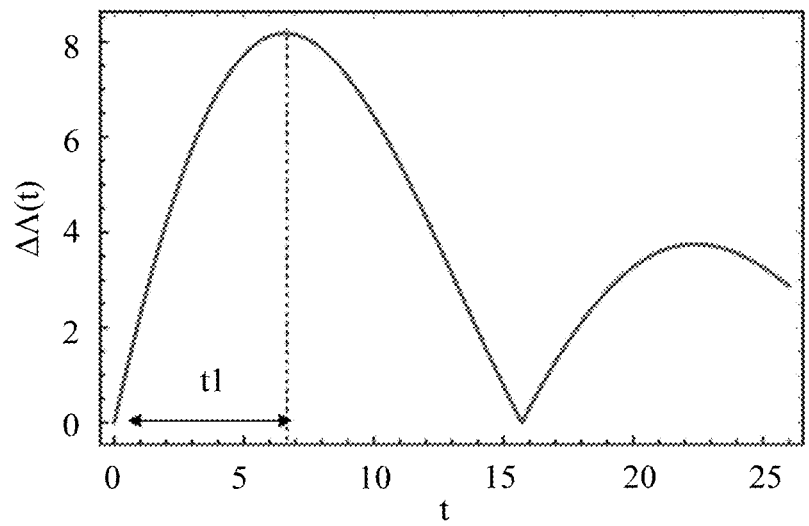
FIG. 3 is a schematic curve diagram of a coupling crosstalk intensity changing with time according to one embodiment.

For the bath noise model, a change of the coupling crosstalk intensity with time can be obtained through parsing, and the change of the coupling crosstalk intensity meets the following relationship:

$$\Delta\Lambda(t) = \left|(1-2p)^t e^{-2i(\omega_2-\omega)t}\left(1-e^{-4i\omega t}\right)\right| + \left|(1-2p)^t e^{2i(\omega_2-\omega)t}\left(1-e^{4i\omega t}\right)\right| + \\ \left|(1-2p)^t e^{-2i(\omega_1-\omega)t}\left(1-e^{-4i\omega t}\right)\right| + \left|(1-2p)^t e^{2i(\omega_1-\omega)t}\left(1-e^{4i\omega t}\right)\right| + \\ \left|(1-2p)^{2t} e^{2i(\omega_1+\omega_2)t}\left(1-e^{4i\omega t}\right)\right| + \left|(1-2p)^{2t} e^{-2i(\omega_1+\omega_2)t}\left(1-e^{-4i\omega t}\right)\right| = \\ \left[(1-2p)^{2t} + 2(1-2p)^t\right]\left(\left|1-e^{-4i\omega t}\right| + \left|1-e^{4i\omega t}\right|\right),$$

where $\Delta\Lambda(t)$ is the coupling crosstalk intensity. It is assumed that the Markov's pure dephasing quantum channel is $\langle e^{-i2\int_0^t f(t')dt'}\rangle=(1-2p)^t$ and $p=\langle f(t)f(t)\rangle$. FIG. 3 shows a result when $\omega_1=\omega_2=0$, $\omega=0.1$, and $p=0.02$, and it can be seen that the coupling crosstalk intensity oscillates and attenuates with time, where $2\omega t_1=2\pi$.

In the foregoing embodiment, a particular crosstalk type of crosstalk intensity, that is, the coupling crosstalk intensity, is described, and because the coupling crosstalk intensity contains no preparation error and no measurement error, the coupling crosstalk intensity can be used to provide guidance for manufacturing and optimization of quantum products, to prevent the manufactured or optimized quantum products from being affected by coupling crosstalk, thereby improving performance of the quantum products.

In one embodiment, for correlation crosstalk analysis between the qubits, steps of the analysis may specifically include: determining, by the terminal, a first bath noise model of the first qubit and the second qubit when both the first qubit and the second qubit are in a pure dephasing noise bath; obtaining a noise correlation method between the qubits; and determining a correlation crosstalk intensity between the first qubit and the second qubit according to the noise correlation method, the first bath noise model, and the crosstalk intensity, the correlation crosstalk intensity attenuating with time and containing no preparation error and no measurement error.

For a first qubit and a second qubit independent of each other, $H_S=\omega_1\sigma_1^z+\omega_2\sigma_2^z$. Assuming that both the first qubit and the second qubit are in independent pure dephasing noise baths, a first bath noise model $H_{SB}=f_1(t)\sigma_1^Z+f_2(t)\sigma_2^Z$ of the first qubit and the second qubit can be obtained, where $f_1(t)$ and $f_2(t)$ respectively represent noise functions corresponding to noise baths in which the first qubit and the second qubit are respectively located, and $\sigma_1^Z$ and $\sigma_2^Z$ respectively represent Pauli matrices corresponding to the first qubit and the second qubit. Considering that there is a noise correlation between the qubits on the superconducting quantum chip, a noise correlation method between the qubits can be obtained, that is, $C_{12}(t)=\langle f_1(t)f_2(t)\rangle$.

Figure 4:
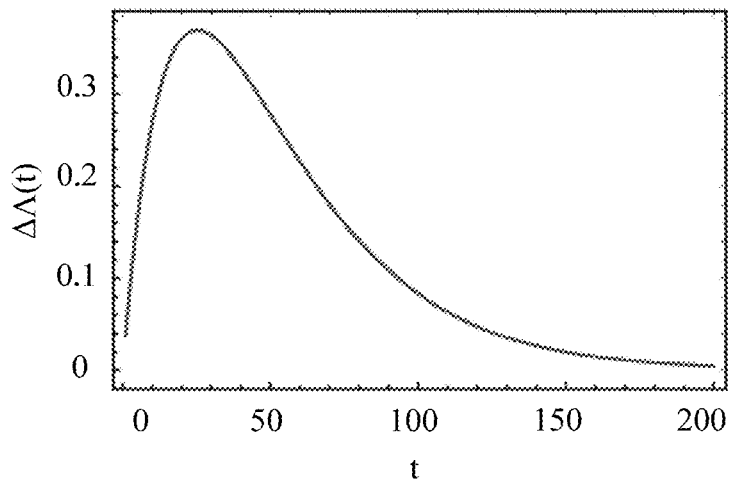
FIG. 4 is a schematic curve diagram of a correlation crosstalk intensity changing with time according to one embodiment.

For the bath noise model, a change of the correlation crosstalk intensity with time can be obtained through parsing, and the change of the correlation crosstalk intensity meets the following relationship:

$$\Delta\Lambda(t) = \\ \left|(1-2p)^{2t} e^{2i(\omega_1+\omega_2)t}[(1-p_c)^t - 1]\right| + \left|(1-2p)^{2t} e^{2i(\omega_1-\omega_2)t}[(1-p_c)^{-t} - 1]\right| + \\ \left|(1-2p)^{2t} e^{-2i(\omega_1-\omega_2)t}[(1-p_c)^{-t} - 1]\right| + \\ \left|(1-2p)^{2t} e^{-2i(\omega_1+\omega_2)t}[(1-p_c)^t - 1]\right|,$$

where $\Delta\Lambda(t)$ is the correlation crosstalk intensity. It is assumed that the Markov's pure dephasing quantum channel is $\langle e^{-i2\int_0^t f(t')dt'}\rangle=(1-2p)^t$, $p_1=\langle f_1(t)f_1(t)\rangle$, and $p_c=\langle f_1(t)f_2(t)\rangle$ correlated noise. As shown in FIG. 4, FIG. 4 shows a result when $\omega_1=0.3$, $\omega_2=0.1$, $p_1=p_2=p=0.01$, and $p_c=0.01$, and it can be seen that the correlation crosstalk intensity attenuates with time.

In the foregoing embodiment, a particular crosstalk type of crosstalk intensity, that is, the correlation crosstalk intensity is described, and because the correlation crosstalk intensity contains no preparation error and no measurement error, the correlation crosstalk intensity can be used to provide guidance for manufacturing and optimization of quantum products, to prevent the manufactured or optimized quantum products from being affected by correlation crosstalk, thereby improving performance of the quantum products.

Figure 5:
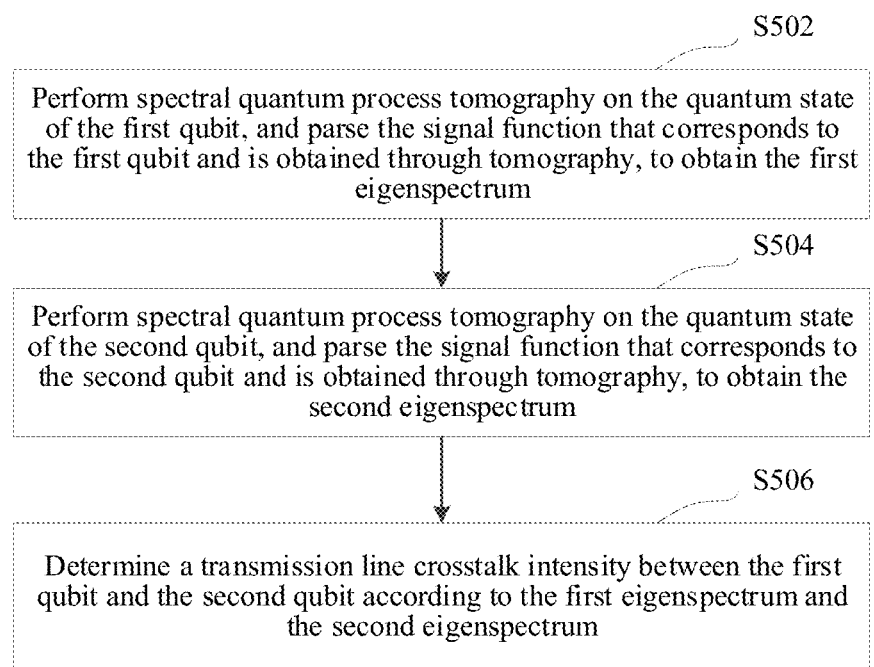
FIG. 5 is a schematic flowchart of steps of calculating a transmission line crosstalk intensity according to one embodiment.

In one embodiment, as shown in FIG. 5, S104 may specifically include the following steps:

S502: Perform spectral quantum process tomography on the quantum state of the first qubit, and parse the signal function that corresponds to the first qubit and is obtained through tomography, to obtain the first eigenspectrum.

The second qubit being in a waiting state when spectral quantum process tomography is performed on the quantum state of the first qubit.

Specifically, the terminal performs spectral quantum process tomography based on the identity gate on the quantum state of the first qubit, the identity gate being a free evolution gate that does not perform a real operation on a quantum circuit in which the first qubit is located, and the second qubit being in a waiting state when spectral quantum process tomography is performed on the quantum state of the first qubit, so as to obtain the signal function corresponding to the first qubit; and parses the signal function corresponding to the first qubit, to obtain the first eigenspectrum. For the step of spectral quantum process tomography on the quantum state corresponding to the first qubit, reference may be made to S104 in the foregoing embodiment.

S504: Perform spectral quantum process tomography on the quantum state of the second qubit, and parse the signal function that corresponds to the second qubit and is obtained through tomography, to obtain the second eigenspectrum.

The first qubit is in a processing state based on target gating when spectral quantum process tomography is performed on the quantum state of the second qubit.

Specifically, the terminal performs spectral quantum process tomography based on the identity gate on the quantum state of the second qubit, the identity gate being a free evolution gate that does not perform a real operation on a quantum circuit in which the second qubit is located, and the first qubit being in a processing state based on target gating when spectral quantum process tomography is performed on the quantum state of the second qubit, so as to obtain the signal function corresponding to the second qubit; and parses the signal function corresponding to the second qubit, to obtain the second eigenspectrum. The second eigenspectrum carries transmission line crosstalk generated by the target gating, so that the transmission line crosstalk intensity obtained according to the first eigenspectrum and the second eigenspectrum is more targeted, thereby facilitating detailed guidance in manufacturing and optimization processes of quantum products. For the step of spectral quantum process tomography on the quantum state corresponding to the second qubit, reference may be made to S104 in the foregoing embodiment.

The target gating may be applied by using any one of a Hadamard gate, a Pauli-X gate, a Pauli-Y gate, a Pauli-Z gate, a phase shift gate, a swap gate, a controlled gate, a universal quantum gate, and a Toffoli gate.

S506: Determine a transmission line crosstalk intensity between the first qubit and the second qubit according to the first eigenspectrum and the second eigenspectrum.

When the application of the target gating is sufficiently quick relative to a frequency of coupling between the qubits, a change of the first qubit q0 caused by the coupling between the qubits is negligible, thereby reflecting a direct crosstalk intensity of the transmission line.

Figure 6:
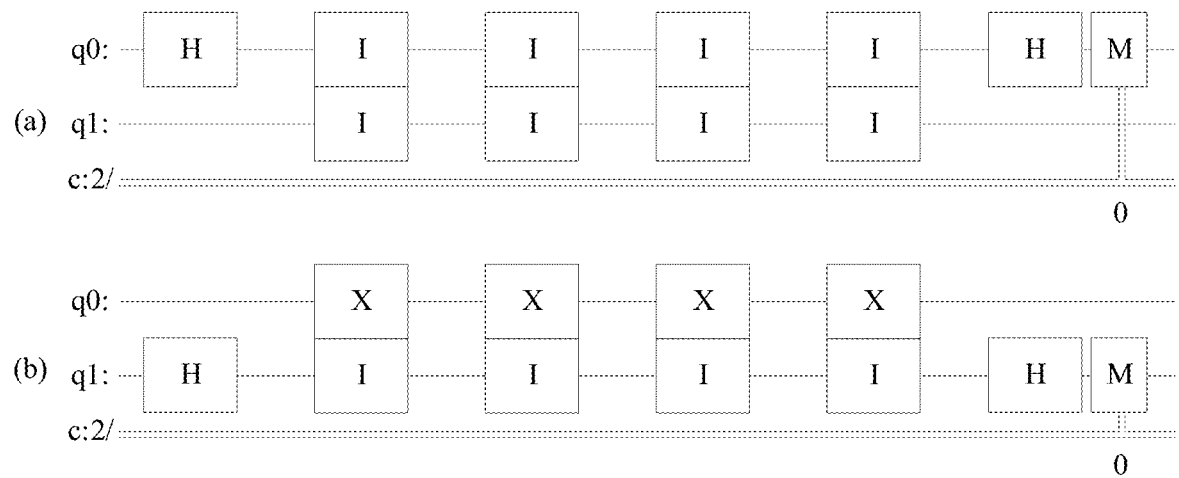
FIG. 6 is a schematic diagram of spectral quantum process tomography based on an identity gate according to another embodiment.

For example, as shown in FIG. 6, the diagram (a) in FIG. 6 illustrates that spectral quantum process tomography based on the identity gate is performed on the first qubit q0, to obtain a series of signal functions $g_0(0), \ldots, g_0(K)$, and a dynamic mapping eigenspectrum $\{1,\lambda_x,\lambda_y,\lambda_z\}$ of the signal functions is calculated. The diagram (b) in FIG. 6 illustrates that spectral quantum process tomography based on the identity gate is performed on the second qubit q1, to obtain a series of signal functions $g_1(0), \ldots, g_1(K)$, and a dynamic mapping eigenspectrum $\{1,\lambda_{x'},\lambda_{y'},\lambda_{z'}\}$ of the signal functions is calculated.

When there is no transmission line crosstalk between the first qubit $q_0$ and the second qubit q1, two obtained single-bit dynamic mappings $\varepsilon_A$, $\varepsilon_B$ meet $\varepsilon_A = \varepsilon_B$. Therefore, the mappings formed by dynamic mapping eigenspectra meet $\Lambda_A = \Lambda_B$. According, if both the first eigenspectrum and the second eigenspectrum are n×n matrices, the transmission line crosstalk intensity may be defined as:

$$\Delta\Lambda = \Sigma_{i=0}^{n} |(\Lambda_A - \Lambda_B)_{ii}|,$$

where n is a positive integer greater than 2, and ii is used for representing a diagonal element of a matrix.

In one embodiment, the terminal determines a second bath noise model of the first qubit when the first qubit is in a pure dephasing noise bath; and determines a variation of the transmission line crosstalk intensity between the first qubit and the second qubit in the noise bath according to the second bath noise model and the crosstalk intensity.

Considering that the first qubit q0 is in a pure dephasing noise bath:

$$H = \omega_1 \sigma_1^Z + f_1(t)\sigma_1^Z.$$

Figure 7:
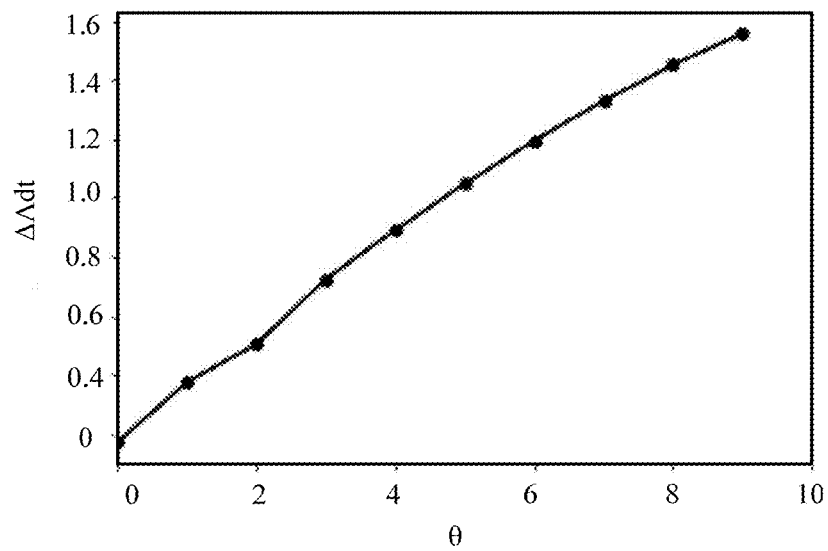
FIG. 7 is a schematic curve diagram of a transmission line crosstalk intensity changing with time according to one embodiment.

When target gating (let the target gating be an X gate) is synchronously applied to the second qubit q1, due to the transmission line crosstalk, the first qubit q0 senses relatively slight rotation in an X direction, and as an angle of rotation increases $$\theta : 0 \to \frac{\pi}{2},$$

the transmission line crosstalk intensity is shown in FIG. 7.

In the foregoing embodiment, spectral quantum process tomography is performed on the quantum state of the first qubit, and the second qubit is in a waiting state during the tomography, to obtain the first eigenspectrum of the signal function corresponding to the first qubit; and spectral quantum process tomography is performed on the quantum state of the second qubit, and the first qubit is in a processing state of target gating during the tomography, so as to obtain the second eigenspectrum of the signal function corresponding to the second qubit. Therefore, the transmission line crosstalk intensity obtained according to the first eigenspectrum and the second eigenspectrum is more targeted, thereby facilitating detailed guidance in manufacturing and optimization processes of quantum products. In addition, there are information losses of the eigenspectrum for common quantum noise channels, and compared with a random benchmark test with an information loss only for a depolarization channel, the crosstalk intensity obtained according to the first eigenspectrum and the second eigenspectrum is more universal, thereby better facilitating detailed guidance in the manufacturing and optimization of the quantum products based on the transmission crosstalk intensity.

Figure 8:
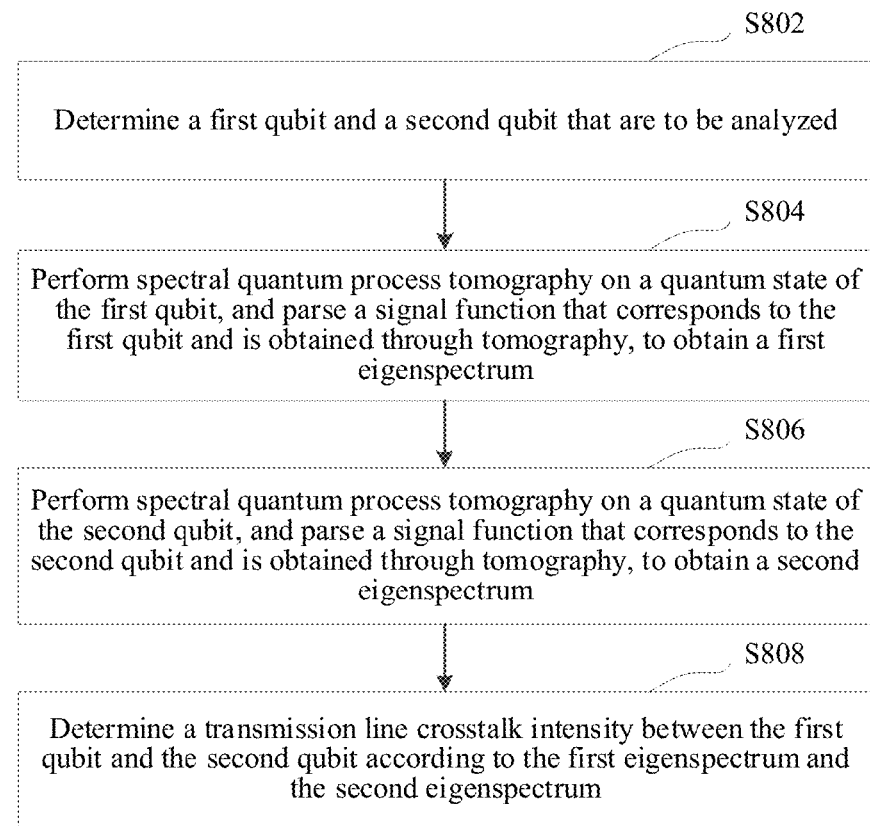
FIG. 8 is a schematic flowchart of a method for analyzing crosstalk between qubits according to another embodiment.

As shown in FIG. 8, one embodiment of the present disclosure provides another method for analyzing crosstalk between qubits. A description is provided by using an example in which the method is applied to the terminal, which includes the following steps:

S802: Determine a first qubit and a second qubit that are to be analyzed.

The terminal may be an electronic device integrated with a quantum circuit or quantum chip, for example, a quantum computer; or the terminal may be an independent quantum chip, for example, a superconducting quantum chip. The first qubit and the second qubit may be two qubits to be analyzed and including different quantum information.

For a quantum chip, a quantity of qubits may be n, where n is greater than 2. For example, there are 72 qubits. A larger quantity of qubits indicates a stronger computation capability of the quantum chip. In one embodiment, the terminal may determine a first qubit and a second qubit that are to be analyzed from a plurality of qubits.

S804: Perform spectral quantum process tomography on a quantum state of the first qubit, and parse a signal function that corresponds to the first qubit and is obtained through tomography, to obtain a first eigenspectrum.

The second qubit being in a waiting state when spectral quantum process tomography is performed on the quantum state of the first qubit. The eigenspectrum may be a dynamic mapping eigenspectrum formed by a quantum during evolution. Spectral quantum process tomography may be that a plurality of types of quantum states of different qubits are inputted into an unknown quantum process, for example, a quantum channel or quantum gate, after the quantum states interact with the unknown quantum process, outputted quantum states are measured, and then the quantum process is estimated based on a relationship between the input and the output.

The quantum state may be a state of a quantum, for example, 0, 1, or a linear superposition state of 0 and 1, $|\omega\rangle = \alpha|0\rangle + \beta|1\rangle$, where $\alpha$ and $\beta$ respectively represent probability amplitudes when the qubit is 0 and 1, $\alpha$ and $\beta$ are complex numbers, and squares $1|\alpha|^2$ and $|\beta|^2$ of moduli of the complex numbers represent probabilities of being 0 and 1.

Spectral quantum process tomography is performed on the quantum state of the first qubit based on an identity gate. The identity gate is a free evolution gate that does not perform a real operation on a quantum circuit in which the first qubit and the second qubit are located.

For example, during spectral quantum process tomography performed on a first qubit q0 based on an identity gate, considering that during preparation of a quantum state, the first qubit undergoes a TPCP dynamic mapping of a preparation error $N_{prep}$, and is acted on by the identity gate for k times. During measurement of the quantum state, the first qubit undergoes a TPCP dynamic mapping of a measurement error $N_{meas}$. A series of signal functions $\{g_0(0), \ldots g_0(k)\}$ are first constructed:

$$g_0(k) = \Sigma_{\mu=1}^N Tr[P_\mu N_{meas} \diamond \Lambda \diamond N_{prep}(P_\mu)],$$

where $P_\mu$ represents a Pauli matrix, $N_{meas}$ represents the measurement error, $N_{prep}$ represents the preparation error, $\Lambda$ represents a dynamic mapping eigenspectrum, which is formed after the identity gate acts k times; and $\diamond$ represents the operation of a superoperator.

First, an initial state of the qubit is prepared by using an eigenbasis of the Pauli matrix; then the quibit undergoes k times of quantum gate evolution, that is, free evolution of the identity gate; subsequently measurement is performed under a selected Pauli operator, and the foregoing steps are repeated for Pauli matrices and eigenbases that are unused; and finally a matrix pencil method may be introduced to parse the group of signal functions for a special form of the foregoing signal functions, to obtain a dynamic mapping eigenspectrum $\Lambda = \{1, \lambda_{0,x}, \lambda_{0,y}, \lambda_{0,z}\}$ with no preparation error and no measurement error.

S806: Perform spectral quantum process tomography on a quantum state of the second qubit, and parse a signal function that corresponds to the second qubit and is obtained through tomography, to obtain a second eigenspectrum.

The first qubit is in a processing state based on target gating when spectral quantum process tomography is performed on the quantum state of the second qubit. Spectral quantum process tomography is performed on the quantum state of the second qubit based on the identity gate.

Specifically, the terminal performs spectral quantum process tomography based on the identity gate on the quantum state of the second qubit, the identity gate being a free evolution gate that does not perform a real operation on a quantum circuit in which the second qubit is located, and the first qubit being in a processing state based on target gating when spectral quantum process tomography is performed on the quantum state of the second qubit, so as to obtain the signal function corresponding to the second qubit; and parses the signal function corresponding to the second qubit, to obtain the second eigenspectrum. For the step of spectral quantum process tomography on the quantum state corresponding to the second qubit, reference may be made to S104 in the foregoing embodiment. The target gating may be applied by using any one of a Hadamard gate, a Pauli-X gate, a Pauli-Y gate, a Pauli-Z gate, a phase shift gate, a swap gate, a controlled gate, a universal quantum gate, and a Toffoli gate.

S808: Determine a transmission line crosstalk intensity between the first qubit and the second qubit according to the first eigenspectrum and the second eigenspectrum.

When the application of the target gating is sufficiently quick relative to a frequency of coupling between the qubits, a change of the first qubit q0 caused by the coupling between the qubits is negligible, thereby reflecting a direct crosstalk intensity of the transmission line. For a specific calculation process of the transmission line crosstalk intensity, reference may be made to S506 in the foregoing embodiment.

In one embodiment, the terminal determines a second bath noise model of the first qubit when the first qubit is in a pure dephasing noise bath; and determines a variation of the transmission line crosstalk intensity between the first qubit and the second qubit in the noise bath according to the second bath noise model and the crosstalk intensity.

For example, as shown in FIG. 6, the diagram (a) in FIG. 6 illustrates that spectral quantum process tomography is performed on a quantum state of the first qubit q0 based on an identity gate, to obtain a series of signal functions $g_0(0), \ldots, g_0(K)$, and a dynamic mapping eigenspectrum $\{1, \lambda_x, \lambda_y, \lambda_z\}$ of the signal functions is calculated, a second qubit q1 keeping waiting during spectral quantum process tomography performed on the quantum state of the first qubit q0. The diagram (b) in FIG. 6 illustrates that spectral quantum process tomography is performed on a quantum state of the second qubit q1 based on the identity gate, to obtain a series of signal functions $g_1(0), \ldots, g_1(K)$, and a dynamic mapping eigenspectrum $\{1, \lambda_{x'}, \lambda_{y'}, \lambda_{z'}\}$ of the signal functions is calculated, the first qubit q0 being in a processing state of target gating during spectral quantum process tomography performed on the quantum state of the second qubit q1. X in the figure represents a preparation process; I represents a free evolution process, that is, performing a free evolution process by using the identity gate; and H and M represent measurement in different directions, and c represents a measurement line.

In the foregoing embodiment, spectral quantum process tomography is performed on the quantum state of the first qubit, and the second qubit is in a waiting state during the tomography, to obtain the first eigenspectrum of the signal function corresponding to the first qubit; and spectral quantum process tomography is performed on the quantum state of the second qubit, and the first qubit is in a processing state of target gating during the tomography, so as to obtain the second eigenspectrum of the signal function corresponding to the second qubit, the second eigenspectrum carrying transmission line crosstalk generated by the target gating. Therefore, the transmission line crosstalk intensity obtained according to the first eigenspectrum and the second eigenspectrum is more targeted, thereby facilitating detailed guidance in manufacturing and optimization processes of quantum products. In addition, there are information losses of the eigenspectrum for common quantum noise channels, and compared with a random benchmark test with an information loss only for a depolarization channel, the crosstalk intensity obtained according to the first eigenspectrum and the second eigenspectrum is more universal, thereby better facilitating detailed guidance in the manufacturing and optimization of the quantum products based on the transmission crosstalk intensity.

For example, the foregoing method for analyzing crosstalk between qubits may be applied to promote the development of quantum products and technologies. For example, technologies/products such as a quantum computer, secure quantum communication, the quantum Internet, and a quantum gauge are susceptible to interference of quantum noise, which severely affects the product performance, and is the primary barrier hindering practical application of the technologies/products. Understanding the properties of quantum noise is critical to the development of these technologies/products, and with constant development of the quantum chip technologies, analysis on noise crosstalk between qubits is critical in addition to noise analysis of a single bit. Subsequently, the analysis on noise crosstalk between qubits is described, which is specifically as follows:

1. Synchronous Spectral Quantum Process Tomography (1) Experimental Scheme

In this embodiment, synchronous spectral quantum process tomography is proposed to study direct coupling crosstalk and correlated noise crosstalk of qubits, and spectral quantum process tomography based on an identity gate is used:

1) The identity gate is equivalent to "waiting" instead of any real gate operation on a quantum circuit, thereby greatly reducing complexity in controlling the quantum circuit compared with a Clifford gate used in a conventional random benchmark test.

2) Because no redundant gate operation is introduced, crosstalk noise in a chip described in this case is simply the inherent coupling between bath noise and qubits, which eliminates an error caused by a gate operation, and makes the source analysis of crosstalk noise clearer.

3) Based on the spectral quantum process tomography, on one hand, complexity of quantum state preparation and measurement is reduced compared with that required by quantum process tomography; and on the other hand, quantum state preparation errors and quantum state measurement errors can be automatically eliminated, making a result more accurate.

The experimental scheme of synchronous spectral quantum process tomography is specifically described as follows:

First, two qubits to be studied (that is, a qubit q0 and a qubit q1) are determined.

Second, as shown in the diagram (a) in FIG. 2, spectral quantum process tomography based on an identity gate is performed on the qubit q0, and simultaneously the qubit q1 keeps waiting.

Third, as shown in the diagram (b) in FIG. 2, spectral quantum process tomography based on the identity gate is performed on the qubit q1, and simultaneously the qubit q0 keeps waiting.

Fourth, as shown in the diagram (c) in FIG. 2, spectral quantum process tomography based on the identity gate is performed on the qubit q0 and the qubit q1.

(2) Data Processing

As shown in the diagram (a) in FIG. 2, spectral quantum process tomography based on the identity gate is performed on the qubit q0, to obtain a series of signal functions $g_0(0), \ldots, g_0(K)$, and a dynamic mapping eigenspectrum $\{1,\lambda_{0,x},\lambda_{0,y},\lambda_{0,z}\}$ of the signal functions is calculated. In the diagram (b) in FIG. 2, spectral quantum process tomography based on the identity gate is performed on the qubit q1, to obtain a series of signal functions $g_1(0), \ldots, g_1(K)$, and a dynamic mapping eigenspectrum $\{1,\lambda_{1,x},\lambda_{1,y},\lambda_{1,z}\}$, of the signal functions is calculated. In the diagram (c) in FIG. 2, spectral quantum process tomography based on the identity gate is performed on the qubit q0 and the qubit q1, to obtain a series of signal functions $g_{01}(0), \ldots, g_{01}(K)$, and a dynamic mapping eigenspectrum $\{1, \lambda_{ix},\lambda_{iy}, \lambda_{iz}, \ldots, \lambda_{zx}, \lambda_{zy}, \lambda_{zz}\}$ of the signal functions is calculated.

If there is no crosstalk of a direct coupling or correlated noise type between the qubit q0 and the qubit q1, a dynamic mapping $\varepsilon_{AB}$ of the two qubits and respective single-bit dynamic mappings $\varepsilon_A$, $\varepsilon_B$ meet:

$$\varepsilon_{AB}=\varepsilon_A\otimes\varepsilon_B.$$

In addition, the mappings formed by dynamic mapping eigenspectra of the signal functions meet:

$$\Lambda_{AB}=\Lambda_A\otimes\Lambda_B.$$

A degree of indivisibility $\Delta\Lambda=\Lambda_{AB}-\Lambda_A\otimes\Lambda_B$ of the dynamic mapping eigenspectra is closely related to a crosstalk intensity between the two qubits. Although the dynamic mapping eigenspectrum is a complete description only for a Pauli channel and there are information losses for common quantum noise channels, the use range is wider than that of a random benchmark test only for a depolarization channel (one type of Pauli channels). Therefore, the crosstalk intensity is defined as follows:

$$\Delta\Lambda=\Sigma_{i=0}{}^n|(\Lambda_{AB}-\Delta\Lambda\otimes\Lambda_B)_{ii}|,$$

where n is a quantity of dimensions of the matrix, that is, the dynamic mapping eigenspectrum $\Lambda_{AB}$, and ii represents a diagonal element of the matrix, i being a positive integer less than or equal to n.

(3) Coupling Crosstalk Analysis Based on Synchronous Spectral Quantum Process Tomography For two independent qubits, $H_S=\omega_1\sigma_1{}^z+\omega_2\sigma_2{}^z$. It is assumed that the qubits are located in independent pure dephasing noise baths, then a bath noise model of the qubit q0 and the qubit q1 is:

$$H_{SB}=f_1(t)\sigma_1{}^z+f_2(t)\sigma_2{}^z.$$

Coupling of the qubits on a superconducting quantum chip has the following form:

$$H_{ZZ}=\omega_{ZZ}\sigma_1{}^z\sigma_2{}^z,$$

where $\omega_{ZZ}$ is coupling strength. For the bath noise model, a change of the crosstalk intensity of the model with time can be obtained through parsing, and the change meets the following relationship:

$$\Delta\Lambda(t) = \left|(1-2p)^t e^{-2i(\omega_2-\omega)t}\left(1-e^{-4i\omega t}\right)\right| + \left|(1-2p)^t e^{2i(\omega_2-\omega)t}\left(1-e^{4i\omega t}\right)\right| + \\ \left|(1-2p)^t e^{-2i(\omega_1-\omega)t}\left(1-e^{-4i\omega t}\right)\right| + \left|(1-2p)^t e^{2i(\omega_1-\omega)t}\left(1-e^{4i\omega t}\right)\right| + \\ \left|(1-2p)^{2t} e^{2i(\omega_1+\omega_2)t}\left(1-e^{4i\omega t}\right)\right| + \left|(1-2p)^{2t} e^{-2i(\omega_1+\omega_2)t}\left(1-e^{-4i\omega t}\right)\right| = \\ \left[(1-2p)^{2t}+2(1-2p)^t\right]\left(\left|1-e^{-4i\omega t}\right|+\left|1-e^{4i\omega t}\right|\right),$$

where $\Delta\Lambda(t)$ is the coupling crosstalk intensity. It is assumed that the Markov's pure dephasing quantum channel is $<e^{-i2\int_0^t f(t')dt'}>=(1-2p)^t$ and $p=<f(t)f(t)>$. FIG. 3 shows a result when $\omega_1=\omega_2=0$, $\omega=0.1$, and $p=0.02$, and it can be seen that the coupling crosstalk intensity oscillates and attenuates with time, where $2\omega t_1=2\pi$.

(4) Analysis on Correlated Noise Between Qubits Based on Synchronous Spectral Quantum Process Tomography For two independent qubits, $H_S=\omega_1\sigma_1{}^z+\omega_2\sigma_2{}^z$. It is assumed that the qubits are located in a pure dephasing noise bath, and a bath noise model of the qubit q0 and the qubit q1 is:

$$H_{SB}=f_1(t)\sigma_1{}^z+f_2(t)\sigma_2{}^z.$$

Considering that there is a noise correlation between the qubits on the superconducting quantum chip:

$$C_{12}(t)=\langle f_1(t)f_2(t)\rangle.$$

For the foregoing noise model, a crosstalk intensity of the model may be obtained through parsing and meets the following formula with time:

$$\Delta\Lambda(t) =$$
$$\left|(1-2p)^{2t}e^{2i(\omega_1+\omega_2)t}[(1-p_c)^t-1]\right| + \left|(1-2p)^{2t}e^{2i(\omega_1-\omega_2)t}[(1-p_c)^{-t}-1]\right| +$$
$$\left|(1-2p)^{2t}e^{-2i(\omega_1-\omega_2)t}[(1-p_c)^{-t}-1]\right| +$$
$$\left|(1-2p)^{2t}e^{-2i(\omega_1+\omega_2)t}[(1-p_c)^t-1]\right|,$$

where $\Delta\Lambda(t)$ is the correlation crosstalk intensity. It is assumed that the Markov's pure dephasing quantum channel $\langle e^{-i2\int_0^t f(t')dt'}\rangle=(1-2p)^t$, $p_1=\langle f_1(t)f_1(t)\rangle$, and $p_c=\langle f_1(t)f_2(t)\rangle$ correlated noise. As shown in FIG. 4, FIG. 4 shows a result when $\omega_1=0.3$, $\omega_2=0.1$, $p_1=p_2=p=0.01$, and $p_c=0.01$, and it can be seen that the correlation crosstalk intensity attenuates with time.

In a superconducting quantum chip, because qubits are far apart, and the qubits are less likely to be located in the same noise source (there is a noise correlation), it is expected that a degree of indivisibility of dynamic mapping eigenspectra can reflect direct coupling between the qubits. However, for a wide range of quantum chips, when the crosstalk of a transmission line between qubits is negligible, dynamic decoupling may be used to further eliminate noise correlation information, so that the degree of indivisibility of the dynamic mapping eigenspectra concentratedly reflects direct coupling between the qubits.

2. Describe Transmission Line Crosstalk Between Qubits Based on Spectral Quantum Process Tomography (1) Experimental Scheme In this embodiment, it is proposed that spectral quantum process tomography is used to study transmission line crosstalk between qubits, to analyze transmission line crosstalk generated by a particular gate by using a dynamic mapping eigenspectrum obtained through the spectral quantum process tomography based on an identity gate as a reference.

1) Analysis on crosstalk of a particular gate makes a result more targeted.

2) By means of the spectral quantum process tomography, on one hand, complexity of quantum state preparation and measurement is reduced compared with that required by quantum process tomography; and on the other hand, quantum state preparation errors and quantum state measurement errors can be automatically eliminated, making the result more accurate.

The experimental scheme of analyzing the transmission line crosstalk through synchronous spectral quantum process tomography is specifically described as follows:

First, a qubit q0 and a qubit q1 to be studied are determined. The qubit q0 is a target bit, and the qubit q1 is an operation bit.

Second, as shown in the diagram (a) in FIG. 6, spectral quantum process tomography based on an identity gate is performed on the qubit q0, and simultaneously the qubit q1 keeps waiting (identity gate).

Finally, as shown in the diagram (b) in FIG. 6, spectral quantum process tomography based on the identity gate is performed on the qubit q1, and studied gating (for example, an X gate) is simultaneously applied to the qubit q0.

(2) Data Processing

As shown in the diagram (a) in FIG. 6, spectral quantum process tomography based on the identity gate is performed on the qubit q0, to obtain a series of signal functions $g_0(0), \ldots, g_0(K)$, and a dynamic mapping eigenspectrum $\{1,\lambda_x,\lambda_y,\lambda_z\}$ of the signal functions is calculated. As shown in the diagram (b) in FIG. 6, spectral quantum process tomography based on the identity gate is performed on the qubit q1, to obtain a series of signal functions $g_1(0), \ldots, g_1(K)$, and a dynamic mapping eigenspectrum $\{1,\lambda_x,\lambda_y,\lambda_z\}$ of the signal functions is calculated.

If there is no transmission line crosstalk between the qubit q0 and the qubit q1, two obtained single-bit dynamic mappings $\varepsilon_A$ and $\varepsilon_B$ meet:

$$\varepsilon_A=\varepsilon_B.$$

In addition, the mappings formed by dynamic mapping eigenspectra of the signal functions meet:

$$\Lambda_A=\Lambda_B.$$

Accordingly, a transmission line crosstalk intensity can be defined.

$$\Delta\Lambda=\Sigma_{i=0}^n|(\Lambda_A-\Lambda_B)_{ii}|.$$

(3) Describe Analysis on Transmission Line Crosstalk Between Qubits Based on Spectral Quantum Process Tomography Considering that the qubit q0 is in a pure dephasing noise bath:

$$H=\omega_1\sigma_1^z+f_1(t)\sigma_1^z.$$

When the X gate is synchronously applied to the qubit q1, due to the transmission line crosstalk, the qubit q0 senses relatively slight rotation in an X direction. As an angle of rotation increases $$\theta:0\to\frac{\pi}{2},$$

the crosstalk intensity is shown in FIG. 7.

Further, when the application of the target is sufficiently quick relative to a frequency of coupling between the qubits, a change of the first qubit q0 caused by the coupling between the qubits is negligible, thereby reflecting a direct crosstalk intensity of the transmission line.

Figure 9:
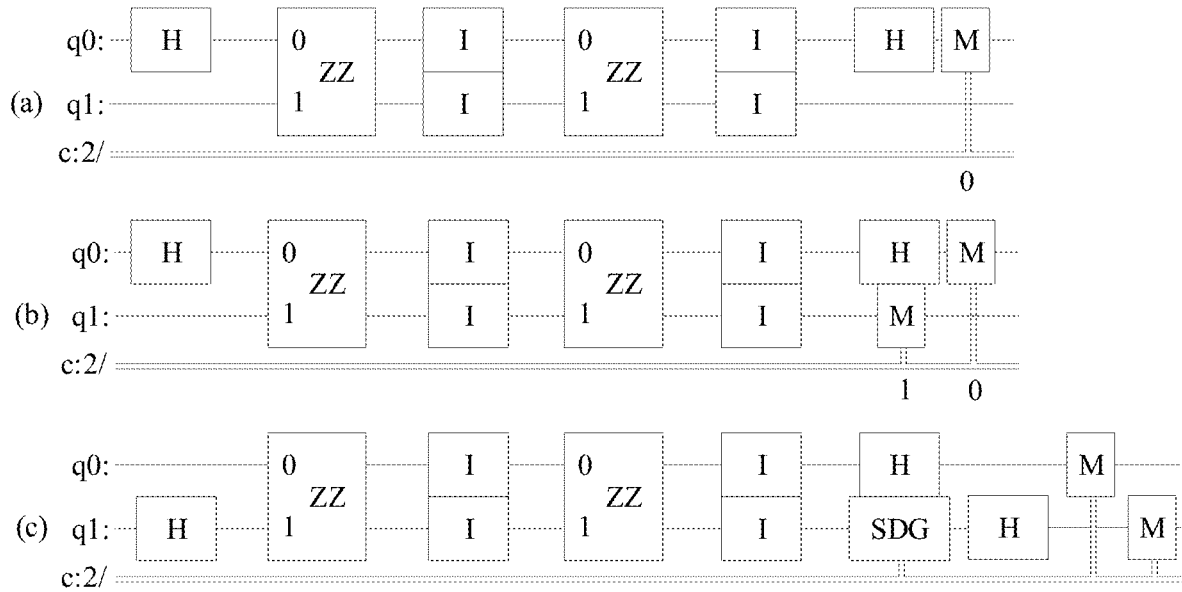
FIG. 9 is a schematic diagram of obtaining a coupling crosstalk intensity through spectral quantum process tomography based on an identity gate according to another embodiment.

3. Result Analysis (1) Simulating Synchronous Spectral Quantum Process Tomography to Analyze Direct Coupling Between Qubits Direct coupling between the qubits is simulated and analyzed by using a qiskit simulator, and a quantum circuit shown in FIG. 9 is used. A ZZ gate corresponds to the direct coupling between the qubits; and an I gate represents free evolution, which includes pure dephasing noise. Spectral quantum process tomography based on an identity gate is first performed on the qubit q0, and simultaneously the qubit q1 keeps waiting; then spectral quantum process tomography based on the identity gate is performed on the qubit q1, and simultaneously the qubit q0 keeps waiting; and finally synchronous spectral quantum process tomography based on the identity gate is performed on the qubit q0 and the qubit q1.

Figure 10:
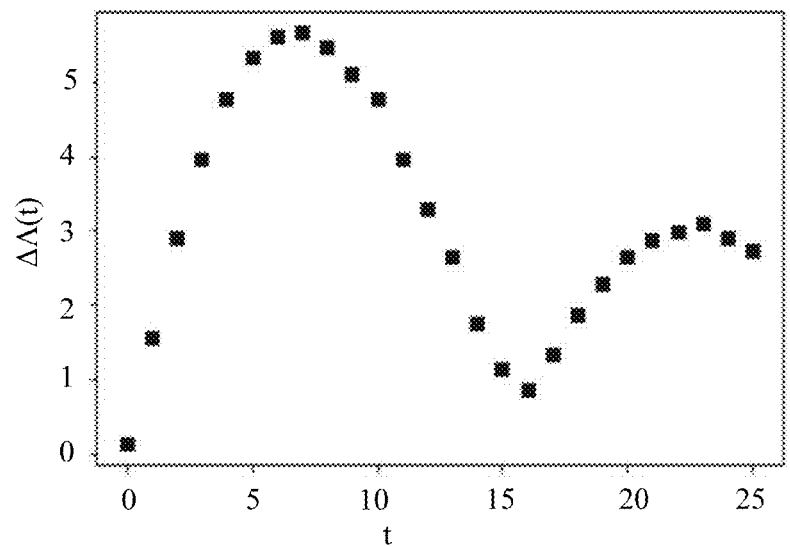
FIG. 10 is a schematic curve diagram of a coupling crosstalk intensity changing with time in an experimental test according to one embodiment.

After dynamic mapping eigenspectra from which quantum state preparation errors and quantum state measurement errors having been respectively eliminated are obtained in the foregoing manner, a change of the crosstalk intensity obtained according to $\Delta\Lambda=\Sigma_{i=0}^{15}|(\Lambda_{AB}-\Lambda_A\otimes\Lambda_B)_{ii}|$ with time is consistent with a previous theoretical expectation, and reference may be made to FIG. 3 and FIG. 10. FIG. 3 shows an expected theoretical coupling crosstalk intensity. FIG. 10 shows an actual crosstalk intensity.

Figure 11:
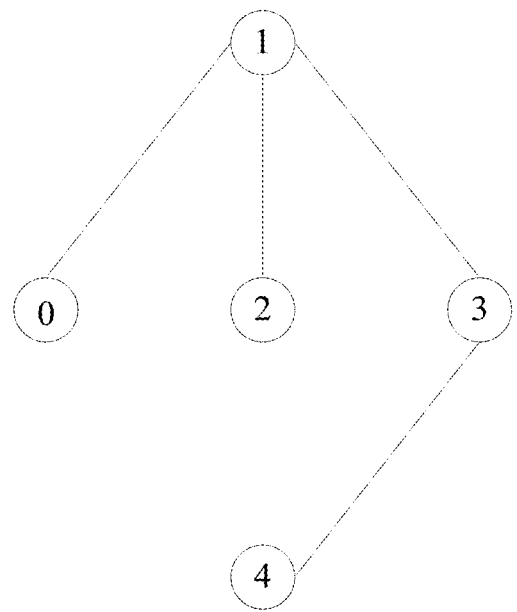
FIG. 11 is a schematic diagram of five qubits in a superconducting quantum chip according to one embodiment.
Figure 12:
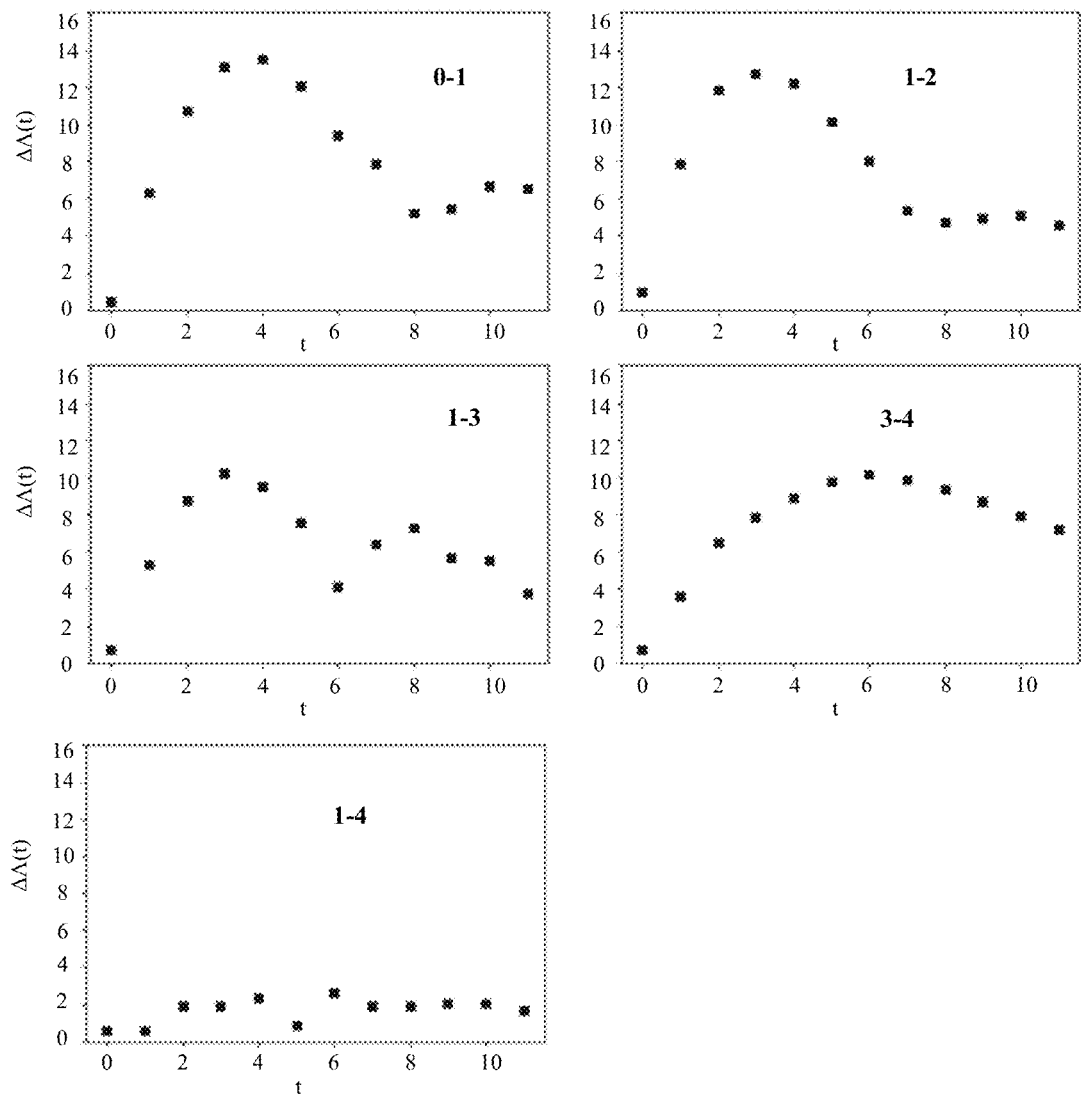
FIG. 12 is a schematic diagram of a coupling crosstalk intensity that is obtained by performing quantum process tomography on five qubits and changes with time according to one embodiment.

(2) Analysis on Synchronous Spectral Quantum Process Tomography of a Quantum Chip For a superconducting quantum chip "ibmq_vigo", as shown in FIG. 11, the superconducting quantum chip includes five (0-4) qubits. Synchronous spectral quantum process tomography is performed on each of the two-qubit combinations 0-1, 0-2, 0-3, 0-4, 1-2, 1-3, 1-4, 2-3, 2-4, and 3-4. By using 0-1, 1-2, 1-3, and 3-4 as an example, it is found that there is direct coupling between qubits to different degrees, and there is no obvious qubit coupling between 1-4.

(3) Analysis on Transmission Line Crosstalk Based on a Dynamic Mapping Eigenspectrum for a Quantum Chip For an IBM superconducting quantum chip "ibmq_vigo", it is assumed that an impact of continuously applying an X gate to the qubit q0 on the qubit q1 is studied.

Figure 13:
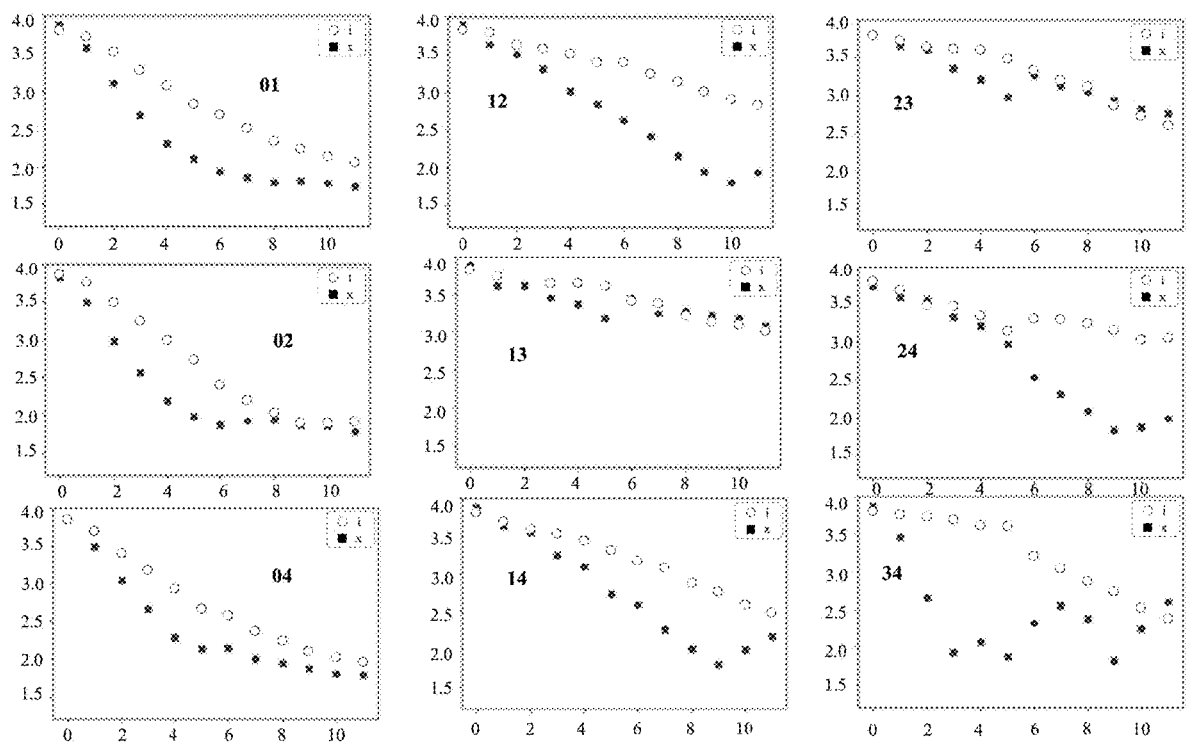
FIG. 13 is a schematic diagram of a transmission line crosstalk intensity that is obtained by performing quantum process tomography on five qubits and changes with time according to one embodiment.

FIG. 13 shows a change a dynamic mapping eigenspectrum of the qubit q1 before and after the X gate is continuously applied to the qubit q0. The circles are free evolution of q1, and the black blocks are evolution results after the X gate is continuously applied to q0. For example, "0-4" represents an impact of applying a gate on the qubit 4 on the qubit 0. It can be seen from FIG. 13 that transmission line crosstalk between the qubits is relatively strong.

By describing the crosstalk noise between the qubits based on spectral quantum process tomography in the foregoing embodiment, the following crosstalk noise can be analyzed: crosstalk between microwave control lines containing no quantum state preparation error and no quantum state measurement error, correlated noise generated by qubits containing no quantum state preparation error and no quantum state measurement error due to being in the same bath, and direct coupling between qubits containing no quantum state preparation error and no quantum state measurement error. Therefore, the following technical effects may be achieved:

(1) Clear analysis on a specific mode of crosstalk between qubits, which greatly improve chip performance in a targeted manner in qubit hardware manufacturing.

(2) A qubit crosstalk noise calibration method based on a synchronous random benchmark test and an associated random benchmark test can be coupled with the method disclosed in the present disclosure.

(3) In the disclosed synchronous spectral quantum process tomography method, only a free evolution gate is used, and no complex operation is applied, making the experiment simple and easy.

Figure 1B:
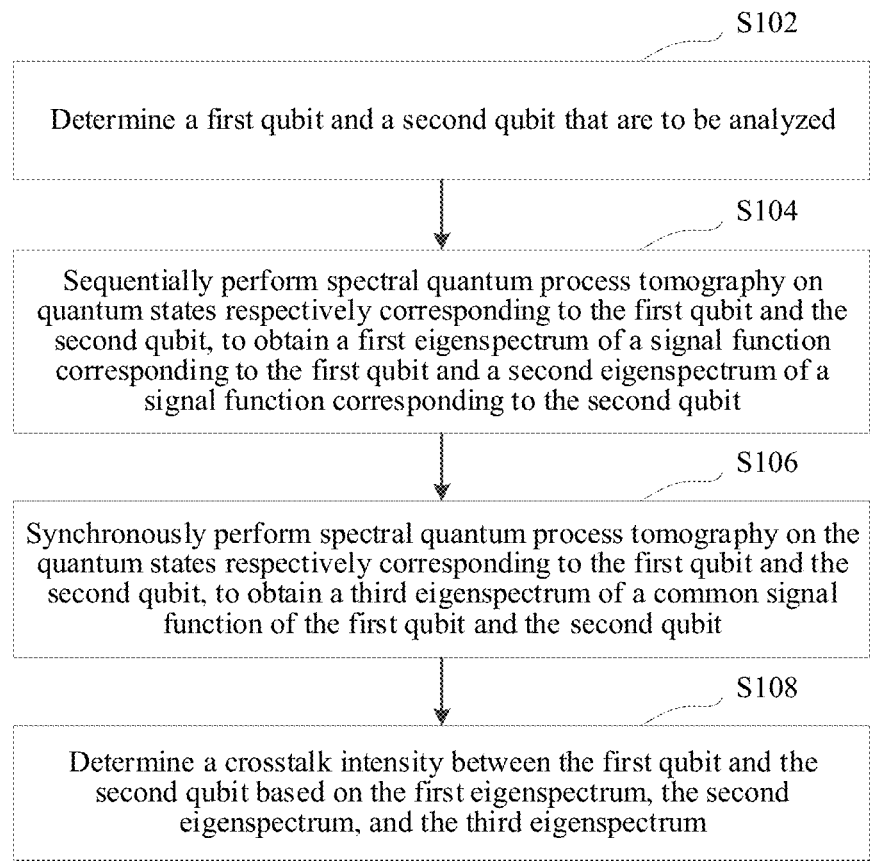
FIG. 1b is a schematic flowchart of a method for analyzing crosstalk between qubits according to one embodiment.

Although the steps in the flowcharts of FIG. 1, FIG. 5, and FIG. 8 are sequentially displayed according to indication of arrows, the steps are not necessarily sequentially performed in the sequence indicated by the arrows. Unless explicitly specified in this specification, execution of the steps is not strictly limited in the sequence, and the steps may be performed in other sequences. Moreover, at least some of the steps in FIG. 1, FIG. 5, and FIG. 8 may include a plurality of steps or a plurality of stages. These steps or stages are not necessarily performed at the same time point, but may be performed at different time points. These steps or stages are not necessarily executed sequentially, but may be performed in turn or alternately with another step or at least some of steps or stages of another step.

Figure 14:
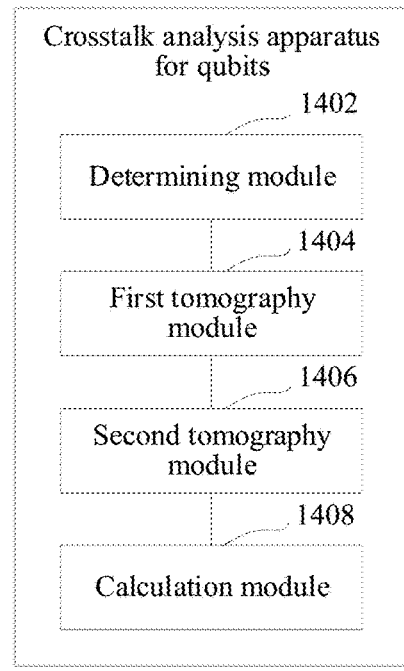
FIG. 14 is a structural block diagram of a crosstalk analysis apparatus for qubits according to one embodiment.

As shown in FIG. 14, one embodiment of the present disclosure provides a crosstalk analysis apparatus for qubits.

The apparatus may use a software module, a hardware module, or a combination of a software module and a hardware module and become a part of a computer device. The apparatus specifically includes: a determining module 1402, a first tomography module 1404, a second tomography module 1406, and a calculation module 1408, where the determining module 1402 is configured to determine a first qubit and a second qubit that are to be analyzed;

the first tomography module 1404 is configured to perform spectral quantum process tomography on quantum states respectively corresponding to the first qubit and the second qubit, to obtain a first eigenspectrum of a signal function corresponding to the first qubit and a second eigenspectrum of a signal function corresponding to the second qubit;

the second tomography module 1406 is configured to perform spectral quantum process tomography on the quantum states respectively corresponding to the first qubit and the second qubit, to obtain a third eigenspectrum of a common signal function of the first qubit and the second qubit; and the calculation module 1408 is configured to determine a crosstalk intensity between the first qubit and the second qubit based on the first eigenspectrum, the second eigenspectrum, and the third eigenspectrum.

In one embodiment, the first tomography module 1404 is further configured to:

perform spectral quantum process tomography on the quantum state of the first qubit, and parse the signal function that corresponds to the first qubit and is obtained through tomography, to obtain the first eigenspectrum, the second qubit being in a waiting state when spectral quantum process tomography is performed on the quantum state of the first qubit; and perform spectral quantum process tomography on the quantum state of the second qubit, and parse the signal function that corresponds to the second qubit and is obtained through tomography, to obtain the second eigenspectrum, the first qubit being in a waiting state when spectral quantum process tomography is performed on the quantum state of the second qubit.

In one embodiment, the second tomography module 1406 is further configured to:

perform spectral quantum process tomography on the quantum states respectively corresponding to the first qubit and the second qubit, to obtain the common signal function of the first qubit and the second qubit, the common signal function including parameters representing a quantum preparation error and a quantum measurement error; and parse the common signal function to obtain the third eigenspectrum.

In one embodiment, the calculation module 1408 is further configured to:

calculate a tensor product between the first eigenspectrum and the second eigenspectrum;

determine a degree of indivisibility of eigenspectra based on a difference between the third eigenspectrum and the tensor product; and determine the degree of indivisibility as the crosstalk intensity between the first qubit and the second qubit.

In one embodiment, spectral quantum process tomography is performed on the quantum states respectively corresponding to the first qubit and the second qubit and a quantum state of a combination of the first qubit and the second qubit all based on an identity gate, the identity gate being a free evolution gate that does not perform a real operation on a quantum circuit in which the first qubit and the second qubit are located.

In the foregoing embodiment, spectral quantum process tomography is first sequentially performed on the quantum states respectively corresponding to the first qubit and the second qubit, to obtain the first eigenspectrum of the signal function corresponding to the first qubit and the second eigenspectrum of the signal function corresponding to the second qubit; and then spectral quantum process tomography is synchronously performed on the quantum states respectively corresponding to the first qubit and the second qubit, to obtain the third eigenspectrum of the signal function corresponding to the combination. Because the degrees of indivisibility among the first eigenspectrum, the second eigenspectrum, and the third eigenspectrum are closely related to a crosstalk intensity between the qubits, the crosstalk intensity between the qubits can be obtained according to the first eigenspectrum, the second eigenspectrum, and the third eigenspectrum, and the crosstalk intensity is not an average result of all types of gate noise and various bath noise, which may be applied to manufacturing and optimization processes of quantum products, and can provide detailed guidance for the manufacturing and optimization of the quantum products. In addition, there are information losses of the eigenspectrum for common quantum noise channels, and compared with a random benchmark test with an information loss only for a depolarization channel, the crosstalk intensity obtained according to the first eigenspectrum, the second eigenspectrum, and the third eigenspectrum is more universal, thereby better facilitating detailed guidance in the manufacturing and optimization of the quantum products based on the crosstalk intensity.

Figure 15:
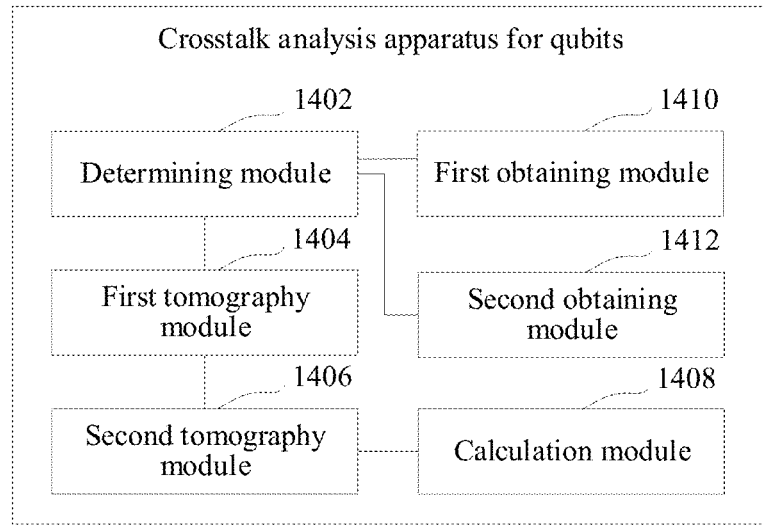
FIG. 15 is a structural block diagram of a crosstalk analysis apparatus for qubits according to another embodiment.

In one embodiment, as shown in FIG. 15, the apparatus further includes:

the determining module 1402, further configured to determine a first bath noise model of the first qubit and the second qubit when both the first qubit and the second qubit are in a pure dephasing noise bath;

a first obtaining module 1410, configured to obtain a qubit coupling method; and the determining module 1402, further configured to determine a coupling crosstalk intensity between the first qubit and the second qubit according to the qubit coupling method, the first bath noise model, and the crosstalk intensity, the coupling crosstalk intensity oscillating and attenuating with time and containing no preparation error and no measurement error.

In the foregoing embodiment, a particular crosstalk type of crosstalk intensity, that is, the coupling crosstalk intensity, is described, and because the coupling crosstalk intensity contains no preparation error and no measurement error, the coupling crosstalk intensity can be used to provide guidance for manufacturing and optimization of quantum products, to prevent the manufactured or optimized quantum products from being affected by coupling crosstalk, thereby improving performance of the quantum products.

In one embodiment, as shown in FIG. 15, the apparatus further includes:

the determining module 1402, further configured to determine a first bath noise model of the first qubit and the second qubit when both the first qubit and the second qubit are in a pure dephasing noise bath;

a second obtaining module 1412, configured to obtain a noise correlation method between the qubits; and the determining module 1402, further configured to determine a correlation crosstalk intensity between the first qubit and the second qubit according to the noise correlation method, the first bath noise model, and the crosstalk intensity, the correlation crosstalk intensity attenuating with time and containing no preparation error and no measurement error.

In the foregoing embodiment, a particular crosstalk type of crosstalk intensity, that is, the correlation crosstalk intensity is described, and because the correlation crosstalk intensity contains no preparation error and no measurement error, the correlation crosstalk intensity can be used to provide guidance for manufacturing and optimization of quantum products, to prevent the manufactured or optimized quantum products from being affected by correlation crosstalk, thereby improving performance of the quantum products.

In one embodiment, the first tomography module 1404 is further configured to: perform spectral quantum process tomography on the quantum state of the first qubit, and parse the signal function that corresponds to the first qubit and is obtained through tomography, to obtain the first eigenspectrum, the second qubit being in a waiting state when spectral quantum process tomography is performed on the quantum state of the first qubit; and perform spectral quantum process tomography on the quantum state of the second qubit, and parse the signal function that corresponds to the second qubit and is obtained through tomography, to obtain the second eigenspectrum, the first qubit being in a processing state based on target gating when spectral quantum process tomography is performed on the quantum state of the second qubit; and the calculation module 1408 is further configured to determine a transmission line crosstalk intensity between the first qubit and the second qubit according to the first eigenspectrum and the second eigenspectrum.

In the foregoing embodiment, spectral quantum process tomography is performed on the quantum state of the first qubit, and the second qubit is in a waiting state during the tomography, to obtain the first eigenspectrum of the signal function corresponding to the first qubit; and spectral quantum process tomography is performed on the quantum state of the second qubit, and the first qubit is in a processing state of target gating during the tomography, so as to obtain the second eigenspectrum of the signal function corresponding to the second qubit. Therefore, the transmission line crosstalk intensity obtained according to the first eigenspectrum and the second eigenspectrum is more targeted, thereby facilitating detailed guidance in manufacturing and optimization processes of quantum products. In addition, there are information losses of the eigenspectrum for common quantum noise channels, and compared with a random benchmark test with an information loss only for a depolarization channel, the crosstalk intensity obtained according to the first eigenspectrum and the second eigenspectrum is more universal, thereby better facilitating detailed guidance in the manufacturing and optimization of the quantum products based on the transmission crosstalk intensity.

Figure 16:
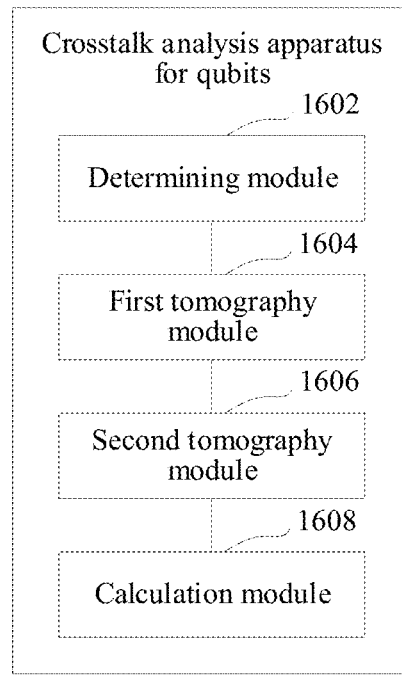
FIG. 16 is a structural block diagram of a crosstalk analysis apparatus for qubits according to another embodiment.

As shown in FIG. 16, one embodiment of the present disclosure provides a crosstalk analysis apparatus for qubits. The apparatus may use a software module, a hardware module, or a combination of a software module and a hardware module and become a part of a computer device. The apparatus specifically includes: a determining module 1602, a first tomography module 1604, a second tomography module 1606, and a calculation module 1608, where the determining module 1602 is configured to determine a first qubit and a second qubit that are to be analyzed;

the first tomography module 1604 is configured to perform spectral quantum process tomography on a quantum state of the first qubit, and parse a signal function that corresponds to the first qubit and is obtained through tomography, to obtain a first eigenspectrum, the second qubit being in a waiting state when spectral quantum process tomography is performed on the quantum state of the first qubit;

the second tomography module 1606 is configured to: perform spectral quantum process tomography on a quantum state of the second qubit, and parse a signal function that corresponds to the second qubit and is obtained through tomography, to obtain a second eigenspectrum, the first qubit being in a processing state based on target gating when spectral quantum process tomography is performed on the quantum state of the second qubit; and the calculation module 1608 is configured to determine a transmission line crosstalk intensity between the first qubit and the second qubit according to the first eigenspectrum and the second eigenspectrum.

In one embodiment, the determining module 1602 is further configured to determine a second bath noise model of the first qubit when the first qubit is in a pure dephasing noise bath; and the calculation module 1608 is further configured to determine a variation of the transmission line crosstalk intensity between the first qubit and the second qubit in the noise bath according to the second bath noise model and the crosstalk intensity.

In one embodiment, spectral quantum process tomography is performed on the quantum states respectively corresponding to the first qubit and the second qubit both based on an identity gate, the identity gate being a free evolution gate that does not perform a real operation on a quantum circuit in which the first qubit and the second qubit are located.

In the foregoing embodiment, spectral quantum process tomography is performed on the quantum state of the first qubit, and the second qubit is in a waiting state during the tomography, to obtain the first eigenspectrum of the signal function corresponding to the first qubit; and spectral quantum process tomography is performed on the quantum state of the second qubit, and the first qubit is in a processing state of target gating during the tomography, so as to obtain the second eigenspectrum of the signal function corresponding to the second qubit, the second eigenspectrum carrying transmission line crosstalk generated by the target gating. Therefore, the transmission line crosstalk intensity obtained according to the first eigenspectrum and the second eigenspectrum is more targeted, thereby facilitating detailed guidance in manufacturing and optimization processes of quantum products. In addition, there are information losses of the eigenspectrum for common quantum noise channels, and compared with a random benchmark test with an information loss only for a depolarization channel, the crosstalk intensity obtained according to the first eigenspectrum and the second eigenspectrum is more universal, thereby better facilitating detailed guidance in the manufacturing and optimization of the quantum products based on the transmission crosstalk intensity.

For a specific limitation on the crosstalk analysis apparatus for qubits, reference may be made to the limitation on the method for analyzing crosstalk between qubits above. Details are not described herein again. The modules in the foregoing crosstalk analysis apparatus for qubits may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

One embodiment of the present disclosure provides a computer device. The computer device may be a terminal or server. A description is provided by using an example in which the computer device is a terminal, and an internal structure diagram of the terminal may be shown in FIG. 17. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal by a wired or wireless method, and the wireless method may be implemented by using Wi-Fi, an operator network, near field communication (NFC), or other technologies. The computer program is executed by the processor to implement a method for analyzing crosstalk between qubits. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 17:
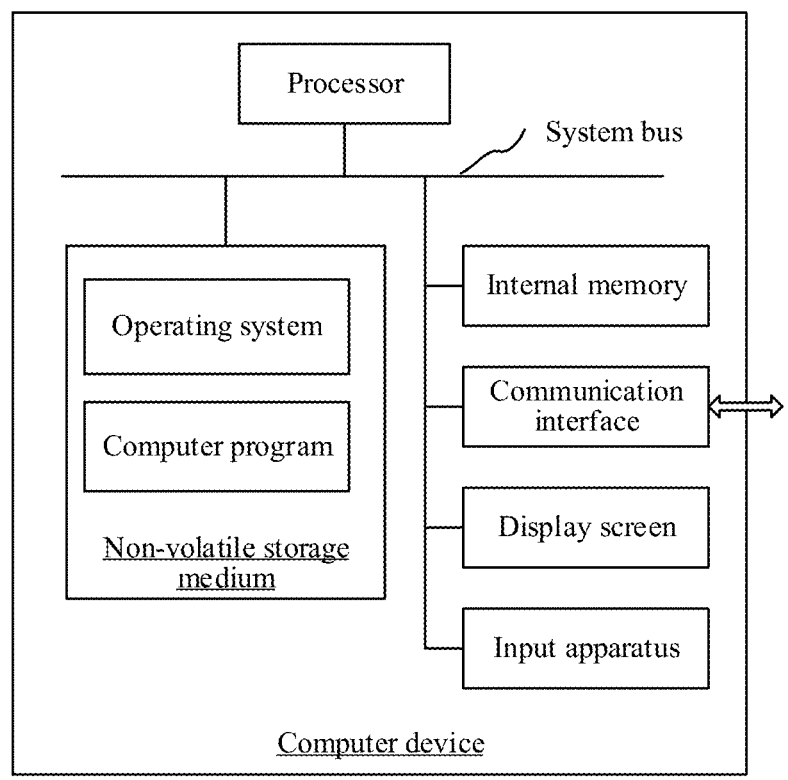
FIG. 17 is a diagram of an internal structure of a computer device according to one embodiment.

A person skilled in the art may understand that, the structure shown in FIG. 17 is only a block diagram of a part of a structure related to a solution of this application and does not limit the computer device to which the solution of this application is applied. Specifically, the computer device may include more or fewer components than those in the drawings, or include a combination of some components, or include different component layouts.

One embodiment further provides a computer device, including a memory and a processor, the memory storing a computer program, the computer program, when executed by the processor, implementing the steps in the foregoing method embodiments.

Some embodiments of the present disclosure provide a computer-readable storage medium is provided, storing a computer program, the computer program, when executed by a processor, implementing the steps in the foregoing method embodiments.

One embodiment of the present disclosure provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as within the scope recorded in this specification.

The foregoing embodiments only describe several implementations of this application, which are described specifically and in detail, but cannot be construed as a limitation to the patent scope of the present disclosure. A person of ordinary skill in the art may make various changes and improvements without departing from the ideas of this application, which shall all fall within the protection scope of this application. Therefore, the protection scope of this application is subject to the protection scope of the appended claims.

What is claimed is:

1. A crosstalk analysis method for qubits, performed by a terminal, the method comprising:
   determining a first qubit and a second qubit that are to be analyzed;
   sequentially performing spectral quantum process tomography on quantum states respectively corresponding to the first qubit and the second qubit, to obtain a first eigenspectrum of a signal function corresponding to the first qubit and a second eigenspectrum of a signal function corresponding to the second qubit;
   synchronously performing spectral quantum process tomography on the quantum states respectively corresponding to the first qubit and the second qubit, to obtain a third eigenspectrum of a common signal function of the first qubit and the second qubit; and
   determining a crosstalk intensity between the first qubit and the second qubit based on the first eigenspectrum, the second eigenspectrum, and the third eigenspectrum.

2. The method according to claim 1, wherein the sequentially performing spectral quantum process tomography on quantum states respectively corresponding to the first qubit and the second qubit, to obtain a first eigenspectrum of a signal function corresponding to the first qubit and a second eigenspectrum of a signal function corresponding to the second qubit comprises:
   performing spectral quantum process tomography on the quantum state of the first qubit, and parsing the signal function that corresponds to the first qubit and is obtained through tomography, to obtain the first eigenspectrum, the second qubit being in a waiting state when spectral quantum process tomography is performed on the quantum state of the first qubit; and
   performing spectral quantum process tomography on the quantum state of the second qubit, and parsing the signal function that corresponds to the second qubit and is obtained through tomography, to obtain the second eigenspectrum, the first qubit being in a waiting state when spectral quantum process tomography is performed on the quantum state of the second qubit.

3. The method according to claim 1, wherein the synchronously performing spectral quantum process tomography on the quantum states respectively corresponding to the first qubit and the second qubit, to obtain a third eigenspectrum of a common signal function of the first qubit and the second qubit comprises:
   synchronously performing spectral quantum process tomography on the quantum states respectively corresponding to the first qubit and the second qubit, to obtain the common signal function of the first qubit and the second qubit, the common signal function comprising parameters representing a quantum preparation error and a quantum measurement error; and
   parsing the common signal function to obtain the third eigenspectrum.

4. The method according to claim 1, wherein the determining a crosstalk intensity between the first qubit and the second qubit based on the first eigenspectrum, the second eigenspectrum, and the third eigenspectrum comprises:
   calculating a tensor product between the first eigenspectrum and the second eigenspectrum;
   determining a degree of indivisibility of eigenspectra based on a difference between the third eigenspectrum and the tensor product; and
   determining the degree of indivisibility as the crosstalk intensity between the first qubit and the second qubit.

5. The method according to claim 1, further comprising:
   determining a first bath noise model of the first qubit and the second qubit when both the first qubit and the second qubit are in a pure dephasing noise bath;
   obtaining a qubit coupling method; and
   determining a coupling crosstalk intensity between the first qubit and the second qubit according to the qubit coupling method, the first bath noise model, and the crosstalk intensity, the coupling crosstalk intensity oscillating and attenuating with time and containing no preparation error and no measurement error.

6. The method according to claim 1, further comprising:
   determining a first bath noise model of the first qubit and the second qubit when both the first qubit and the second qubit are in a pure dephasing noise bath;
   obtaining a noise correlation method between the qubits;
   determining a correlation crosstalk intensity between the first qubit and the second qubit according to the noise correlation method, the first bath noise model, and the crosstalk intensity, the correlation crosstalk intensity attenuating with time and containing no preparation error and no measurement error.

7. The method according to claim 1, wherein the sequentially performing spectral quantum process tomography on quantum states respectively corresponding to the first qubit and the second qubit, to obtain a first eigenspectrum of a signal function corresponding to the first qubit and a second eigenspectrum of a signal function corresponding to the second qubit comprises:
   performing spectral quantum process tomography on the quantum state of the first qubit, and parsing the signal function that corresponds to the first qubit and is obtained through tomography, to obtain the first eigenspectrum, the second qubit being in a waiting state when spectral quantum process tomography is performed on the quantum state of the first qubit; and
   performing spectral quantum process tomography on the quantum state of the second qubit, and parsing the signal function that corresponds to the second qubit and is obtained through tomography, to obtain the second eigenspectrum, the first qubit being in a processing state based on target gating when spectral quantum process tomography is performed on the quantum state of the second qubit; and the method further comprises: determining a transmission line crosstalk intensity between the first qubit and the second qubit according to the first eigenspectrum and the second eigenspectrum.

8. The method according to claim 1, wherein spectral quantum process tomography is performed on the quantum states respectively corresponding to the first qubit and the second qubit and a quantum state of a combination of the first qubit and the second qubit all based on an identity gate, the identity gate being a free evolution gate that does not perform a real operation on a quantum circuit in which the first qubit and the second qubit are located.

9. A crosstalk analysis apparatus for qubits, comprising a memory storing computer instructions and a processor coupled to the memory, when executing the computer instructions, the processor being configured to:

identify a first qubit and a second qubit;

sequentially perform spectral quantum process tomography on quantum states corresponding to the first qubit and the second qubit, to obtain a first eigenspectrum of a signal function corresponding to the first qubit and a second eigenspectrum of a signal function corresponding to the second qubit;

synchronously perform spectral quantum process tomography on the quantum states corresponding to the first qubit and the second qubit, to obtain a third eigenspectrum of a common signal function of the first qubit and the second qubit; and determine a crosstalk intensity between the first qubit and the second qubit based on the first eigenspectrum, the second eigenspectrum, and the third eigenspectrum.

10. The apparatus according to claim 9, wherein the processor is further configured to:

perform spectral quantum process tomography on the quantum state of the first qubit, and parse the signal function that corresponds to the first qubit and is obtained through tomography, to obtain the first eigenspectrum, the second qubit being in a waiting state when spectral quantum process tomography is performed on the quantum state of the first qubit; and perform spectral quantum process tomography on the quantum state of the second qubit, and parse the signal function that corresponds to the second qubit and is obtained through tomography, to obtain the second eigenspectrum, the first qubit being in a waiting state when spectral quantum process tomography is performed on the quantum state of the second qubit.

11. The apparatus according to claim 9, wherein the processor is further configured to:

synchronously perform spectral quantum process tomography on the quantum states corresponding to the first qubit and the second qubit, to obtain the common signal function of the first qubit and the second qubit, the common signal function comprising parameters representing a quantum preparation error and a quantum measurement error; and parse the common signal function to obtain the third eigenspectrum.

12. The apparatus according to claim 9, wherein the processor is further configured to:

calculate a tensor product between the first eigenspectrum and the second eigenspectrum;

determine a degree of indivisibility of eigenspectra based on a difference between the third eigenspectrum and the tensor product; and determine the degree of indivisibility as the crosstalk intensity between the first qubit and the second qubit.

13. The apparatus according to claim 9, wherein the processor is further configured to:

determine a first bath noise model of the first qubit and the second qubit when both the first qubit and the second qubit are in a pure dephasing noise bath;

obtain a qubit coupling method; and determine a coupling crosstalk intensity between the first qubit and the second qubit according to the qubit coupling method, the first bath noise model, and the crosstalk intensity, the coupling crosstalk intensity oscillating and attenuating with time and containing no preparation error and no measurement error.

14. The apparatus according to claim 9, wherein the processor is further configured to:

determine a first bath noise model of the first qubit and the second qubit when both the first qubit and the second qubit are in a pure dephasing noise bath;

obtain a noise correlation method between the qubits;

determine a correlation crosstalk intensity between the first qubit and the second qubit according to the noise correlation method, the first bath noise model, and the crosstalk intensity, the correlation crosstalk intensity attenuating with time and containing no preparation error and no measurement error.

15. The apparatus according to claim 9, wherein spectral quantum process tomography is performed on the quantum states respectively corresponding to the first qubit and the second qubit and a quantum state of a combination of the first qubit and the second qubit all based on an identity gate, the identity gate being a free evolution gate that does not perform a real operation on a quantum circuit in which the first qubit and the second qubit are located.

16. The apparatus according to claim 9, wherein the processor is further configured to:

perform spectral quantum process tomography on the quantum state of the first qubit, and parse the signal function that corresponds to the first qubit and is obtained through tomography, to obtain the first eigenspectrum, the second qubit being in a waiting state when spectral quantum process tomography is performed on the quantum state of the first qubit;

perform spectral quantum process tomography on the quantum state of the second qubit, and parse the signal function that corresponds to the second qubit and is obtained through tomography, to obtain the second eigenspectrum, the first qubit being in a processing state based on target gating when spectral quantum process tomography is performed on the quantum state of the second qubit; and determine a transmission line crosstalk intensity between the first qubit and the second qubit according to the first eigenspectrum and the second eigenspectrum.

17. A crosstalk analysis method for qubits, performed by a terminal, the method comprising:

determining a first qubit and a second qubit that are to be analyzed;

performing spectral quantum process tomography on a quantum state of the first qubit, and parsing a signal function that corresponds to the first qubit and is obtained through tomography, to obtain a first eigenspectrum, the second qubit being in a waiting state when spectral quantum process tomography is performed on the quantum state of the first qubit;

performing spectral quantum process tomography on a quantum state of the second qubit, and parsing a signal function that corresponds to the second qubit and is obtained through tomography, to obtain a second eigenspectrum, the first qubit being in a processing state based on target gating when spectral quantum process tomography is performed on the quantum state of the second qubit; and determining a transmission line crosstalk intensity between the first qubit and the second qubit according to the first eigenspectrum and the second eigenspectrum.

18. The method according to claim 17, further comprising:

determining a second bath noise model of the first qubit in a case that the first qubit is in a pure dephasing noise bath; and determining a variation of the transmission line crosstalk intensity between the first qubit and the second qubit in the noise bath according to the second bath noise model and the crosstalk intensity.

19. The method according to claim 18, wherein spectral quantum process tomography is performed on the quantum states respectively corresponding to the first qubit and the second qubit both based on an identity gate, the identity gate being a free evolution gate that does not perform a real operation on a quantum circuit in which the first qubit and the second qubit are located.

20. The method according to claim 17, wherein spectral quantum process tomography is performed on the quantum states respectively corresponding to the first qubit and the second qubit both based on an identity gate, the identity gate being a free evolution gate that does not perform a real operation on a quantum circuit in which the first qubit and the second qubit are located.

* * * * *